United States Patent
Zhou

(10) Patent No.: US 10,187,805 B2
(45) Date of Patent: Jan. 22, 2019

(54) RADIO RESOURCE SHARING METHOD, AND DEVICE

(71) Applicant: HUAWEI TECHNOLOGIES CO., LTD., Shenzhen, Guangdong (CN)

(72) Inventor: Guohua Zhou, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/631,543

(22) Filed: Jun. 23, 2017

(65) Prior Publication Data

US 2017/0311173 A1 Oct. 26, 2017

Related U.S. Application Data

(63) Continuation of application No. PCT/CN2014/094831, filed on Dec. 24, 2014.

(51) Int. Cl.
*H04W 16/14* (2009.01)
*H04W 72/04* (2009.01)

(52) U.S. Cl.
CPC ........... *H04W 16/14* (2013.01); *H04W 72/04* (2013.01); *H04W 72/048* (2013.01)

(58) Field of Classification Search
CPC . H04W 16/14; H04W 72/04; H04W 72/0453; H04L 5/001; H04L 5/0048
See application file for complete search history.

(56) References Cited

U.S. PATENT DOCUMENTS

| | | | |
|---|---|---|---|
| 2013/0208587 A1* | 8/2013 | Bala | H04W 16/14 370/230 |
| 2013/0258864 A1 | 10/2013 | Chen et al. | |
| 2013/0294415 A1 | 11/2013 | Moilanen et al. | |
| 2016/0044699 A1 | 2/2016 | Deng et al. | |

FOREIGN PATENT DOCUMENTS

| | | |
|---|---|---|
| CN | 103841564 A | 6/2014 |
| EP | 2083592 A2 | 7/2009 |
| EP | 2 203 011 A1 | 6/2010 |

(Continued)

OTHER PUBLICATIONS

Extended European Search Report dated Nov. 24, 2017 in corresponding European Patent Application No. 14908746.2.
(Continued)

*Primary Examiner* — Jamal Javaid
(74) *Attorney, Agent, or Firm* — Staas & Halsey LLP

(57) ABSTRACT

According to a radio resource sharing method and a device that are provided in embodiments of the present disclosure, first, a network control device obtains a network parameter of a first communications system, and configures a spectrum sharing manner between the first communications system and a second communications system according to the network parameter; and next, sends a spectrum resource allocation message to a base station in the second communications system. The spectrum resource allocation message includes the determined spectrum sharing manner and information about a spectrum resource allocated to the second communications system. In this way, inter-system spectrum sharing can be implemented in different network statuses.

14 Claims, 20 Drawing Sheets

(56) References Cited

FOREIGN PATENT DOCUMENTS

| WO | 2008/088254 A1 | 7/2008 |
| WO | 2012/072118 A1 | 6/2012 |
| WO | 2014/079286 A1 | 5/2014 |
| WO | 2014/169488 A1 | 10/2014 |

OTHER PUBLICATIONS

International Search Report dated Oct. 20, 2015 in corresponding International Patent Application No. PCT/CN2014/094831.
International Search Report, dated Oct. 20, 2015, in International Application No. PCT/CN2014/094831 (4 pp.).
Office Action, dated Sep. 30, 2018, in Chinese Application No. 201480036412.9 (6 pp.).

\* cited by examiner

RADIO RESOURCE SHARING METHOD, AND DEVICE

CROSS-REFERENCE TO RELATED APPLICATIONS

This application is a continuation of International Application No. PCT/CN2014/094831, filed on Dec. 24, 2014, the disclosure of which is hereby incorporated by reference in its entirety.

TECHNICAL FIELD

Embodiments of the present disclosure relate to communications technologies, and in particular, to a radio resource sharing method and a device.

BACKGROUND

Spectrum sharing means that when spectrum resources required by actual load in a standard are fewer than given spectrum resources configured for the standard, in the standard, a part of the spectrum resources can be temporarily provided to another standard for use, so as to improve spectrum resource utilization. In a process of spectrum sharing between systems with different radio access technology, inter-system interference exists. Consequently, user experience of terminals served by the inter-RAT systems is deteriorated. Therefore, how to implement inter-system spectrum sharing is a technical problem that currently needs to be resolved.

SUMMARY

Embodiments of the present disclosure provide a radio resource sharing method and a device, so as to implement inter-system spectrum sharing in different network statuses.

According to a first aspect, a radio resource sharing method is provided, where the method includes:
  obtaining, by a network control device, a network parameter of a first communications system;
  configuring, by the network control device, a spectrum sharing manner between the first communications system and a second communications system according to the network parameter; and
  sending, by the network control device, a spectrum resource allocation message to a base station in the second communications system, where the spectrum resource allocation message includes the determined spectrum sharing manner and information about a spectrum resource allocated to the second communications system; where
  the network parameter includes at least one type of: distribution information of terminals with different capabilities in the first communications system or carrier quantity information of a base station in the first communications system;
  the distribution information of terminals with different capabilities includes: a proportion or quantity of terminals in the first communications system that support carrier aggregation, distribution information of terminals in each cell that support carrier aggregation, a proportion or quantity of terminals that are in all terminals supporting carrier aggregation and that support cross-carrier scheduling, and distribution information of terminals in each cell that support cross-carrier scheduling; and the spectrum sharing manner includes: a first sharing manner that does not support carrier aggregation, a second sharing manner that supports carrier aggregation, and a third sharing manner that supports both carrier aggregation and cross-carrier scheduling.

With reference to the first aspect, in a first possible implementation, the network control device is a central node or the base station in the first communications system; and
  when the network control device is the central node, the method further includes:
  receiving, by the network control device, a spectrum allocation result from the base station in the second communications system; and
  sending, by the network control device, the spectrum allocation result to the base station in the first communications system, so that the base station in the first communications system enables, according to the spectrum allocation result, the first communications system to perform spectrum sharing with the second communications system, where
  the central node includes a single resource controller or an operation administration and maintenance device; or
  when the network control device is the base station in the first communications system, the method further includes:
  receiving, by the network control device, a spectrum allocation result from the base station in the second communications system; and
  enabling, by the network control device according to the spectrum allocation result, the second communications system to perform spectrum sharing with the first communications system.

With reference to the first possible implementation of the first aspect, in a second possible implementation, configuring, by the network control device, the first sharing manner includes:
  in a downlink of the first communications system and a downlink of the second communications system, configuring, by the network control device for a broadcast control channel of the second communications system a first spectrum exclusive to the second communications system, and using the first spectrum as an exclusive spectrum of the broadcast control channel; and
  configuring, by the network control device as an exclusive spectrum of the first communications system, a second spectrum on which a common channel of the first communications system is located; and configuring a third spectrum within downlink system bandwidth of the first communications system as a downlink shared spectrum of the first communications system and the second communications system, where the third spectrum is all or some spectrums, except the second spectrum, within the downlink system bandwidth of the first communications system; and
  in an uplink of the first communications system and an uplink of the second communications system, configuring, by the network control device as an exclusive spectrum of the first communications system, a fourth spectrum on which an uplink control channel is located and that is within system bandwidth of the first communications system; and configuring a fifth spectrum within uplink system bandwidth of the first communications system as an uplink shared spectrum of the first communications system and the second communications system, where the fifth spectrum is all or some spectrums, except the fourth spectrum, within the uplink system bandwidth of the first communications system.

With reference to the second possible implementation of the first aspect, in a third possible implementation, the first communications system and the second communications system use the third spectrum and the fifth spectrum in a time division manner;

in a downlink transmission timeslot of the second communications system, the third spectrum is used by the second communications system to transmit a physical downlink shared channel, the first spectrum is used by the second communications system to transmit the broadcast control channel, the second spectrum is used by the first communications system to transmit a downlink common channel, and the second spectrum is further used to transmit a downlink feedback for uplink data in the first communications system;

in a downlink transmission timeslot of the first communications system, the third spectrum is used by the first communications system to transmit a physical downlink shared channel, the first spectrum is used by the second communications system to transmit the broadcast control channel, the second spectrum is used by the first communications system to transmit the downlink common channel, and the second spectrum is used to transmit the downlink feedback for the uplink data in the first communications system;

in an uplink transmission timeslot of the second communications system, the fifth spectrum is used by the second communications system to transmit a physical uplink shared channel, and the fourth spectrum is used by the first communications system to transmit a physical uplink control channel; and in an uplink transmission timeslot of the first communications system, the fifth spectrum is used by the first communications system to transmit a physical uplink shared channel, and the fourth spectrum is used by the first communications system to transmit the physical uplink control channel.

With reference to the third possible implementation of the first aspect, in a fourth possible implementation, in the downlink transmission timeslot of the second communications system, the second spectrum is further used to transmit a physical downlink control channel of the first communications system, the second spectrum is further used to transmit the physical downlink shared channel, the third spectrum is further used to transmit a downlink pilot channel, and the second spectrum is further used by the first communications system to transmit a downlink feedback for uplink data of user equipment in an activated state;

in the downlink transmission timeslot of the first communications system, the third spectrum is further used by the first communications system to transmit the downlink pilot channel and the physical downlink shared channel, and the second spectrum is further used by the first communications system to transmit the downlink feedback for the uplink data of the user equipment in the activated state;

in the uplink transmission timeslot of the second communications system, the fifth spectrum is further used by the first communications system to transmit an uplink sounding signal; and in the uplink transmission timeslot of the first communications system, the fifth spectrum is further used by the first communications system to transmit the uplink sounding signal and the physical uplink shared channel.

With reference to the first possible implementation of the first aspect, in a fifth possible implementation, configuring, by the network control device, the second sharing manner includes:

in a downlink of the first communications system and a downlink of the second communications system, configuring, by the network control device for a broadcast control channel of the second communications system, a first spectrum exclusive to the second communications system, and using the first spectrum as an exclusive spectrum of the broadcast control channel; and configuring, by the network control device, the first communications system to send a downlink primary synchronization channel and a downlink secondary synchronization channel on a second spectrum on which a synchronization channel of the first communications system is located, where a manner of sending the downlink primary synchronization channel and the downlink secondary synchronization channel includes at least one of the following manners:

the network control device configures the second spectrum as an exclusive spectrum of the first communications system, and configures a third spectrum within downlink system bandwidth of the first communications system as a downlink shared spectrum of the first communications system and the second communications system, where the third spectrum is all or some spectrums, except the second spectrum, within the downlink system bandwidth of the first communications system, and the downlink primary synchronization channel and the downlink secondary synchronization channel of the first communications system are sent on the second spectrum; or the network control device configures the second spectrum as an exclusive spectrum of the first communications system, and configures a third spectrum within downlink system bandwidth of the first communications system as a downlink shared spectrum of the first communications system and the second communications system, where the third spectrum is all or some spectrums, except the second spectrum, within the downlink system bandwidth of the first communications system, and the downlink primary synchronization channel and the downlink secondary synchronization channel of the first communications system are sent on the second spectrum only in a downlink transmission timeslot of the first communications system; or the network control device configures the second spectrum as an exclusive spectrum of the first communications system, and configures a third spectrum within downlink system bandwidth of the first communications system as a downlink shared spectrum of the first communications system and the second communications system, where the third spectrum is all or some spectrums, except the second spectrum, within the downlink system bandwidth of the first communications system, the network control device enables interference, caused by the first communications system to the second spectrum, to be lower than a preset threshold, and the downlink primary synchronization channel and the downlink secondary synchronization channel of the first communications system are sent on the second spectrum; and in an uplink of the first communications system and an uplink of the second communications system, configuring, by the network control device, a fifth spectrum within uplink system bandwidth of the first communications system as an uplink shared spectrum of the first communications system and the second communications system, where the fifth spectrum is all or some spectrum configurations within the uplink system bandwidth of the first communications system, where a downlink carrier of the third spectrum and an uplink carrier of the fifth spectrum are used to be configured as secondary component carriers for configuring carrier aggregation by the first communications system; and the first communications system and the second communications system use the third spectrum and the fifth spectrum in a time division manner.

With reference to the fifth possible implementation of the first aspect, in a sixth possible implementation, in a downlink transmission timeslot of the second communications system, the third spectrum is used by the second communications system to transmit a physical downlink shared channel, or the second spectrum is further used to transmit a downlink feedback for uplink data in the first communications system;

in the downlink transmission timeslot of the first communications system, the third spectrum is used by the first communications system to transmit a physical downlink shared channel, the first spectrum is used by the second communications system to transmit the broadcast control channel, the second spectrum is used to transmit the downlink feedback for the uplink data in the first communications system, and the second spectrum and the third spectrum are further used to transmit a physical downlink control channel in the downlink transmission timeslot;

in an uplink transmission timeslot of the second communications system, the fifth spectrum is used by the second communications system to transmit a physical uplink shared channel, and an uplink feedback that is for downlink data and is of user equipment in an activated state in the first communications system is transmitted on a primary component carrier of the first communications system; and in an uplink transmission timeslot of the first communications system, the fifth spectrum is used by the first communications system to transmit a physical uplink shared channel, the uplink feedback that is for the downlink data and is of the user equipment in the activated state in the first communications system is transmitted on the primary component carrier of the first communications system, and scheduling information of the physical uplink shared channel is transmitted on the second spectrum and the third spectrum.

With reference to the sixth possible implementation of the first aspect, in a seventh possible implementation, in the downlink transmission timeslot of the second communications system, the first communications system deactivates a carrier of the third spectrum used by the first communications system, and the first communications system does not transmit a downlink pilot channel on the fifth spectrum;

in the downlink transmission timeslot of the first communications system, the first communications system activates the carrier of the third spectrum used by the first communications system, and the fifth spectrum is further used by the first communications system to transmit the downlink pilot channel;

in the uplink transmission timeslot of the second communications system, the first communications system deactivates a carrier of the fifth spectrum used by the first communications system, and an uplink sounding signal of the first communications system is not transmitted on the fifth spectrum; and in the uplink transmission timeslot of the first communications system, the first communications system activates the carrier of the fifth spectrum used by the first communications system, and the fifth spectrum is further used to transmit the uplink sounding signal of the first communications system.

With reference to the fifth possible implementation of the first aspect, in an eighth possible implementation, the method further includes:

in the downlink of the first communications system and the downlink of the second communications system, configuring, by the network control device, that a transmission timeslot of the second communications system and a transmission timeslot of the first communications system partially overlap, and controlling not to send a signal of the second communications system within a time slice overlapped between the transmission timeslot of the second communications system and the transmission timeslot of the first communications system.

With reference to the fifth possible implementation of the first aspect, in a ninth possible implementation, configuring, by the network control device, the third sharing manner includes:

in the downlink of the first communications system and the downlink of the second communications system, the downlink carrier of the third spectrum and the uplink carrier of the fifth spectrum are used as secondary component carriers for configuring carrier aggregation by the first communications system;

in the downlink transmission timeslot of the first communications system, the third spectrum is used by the first communications system to transmit a physical downlink shared channel, and scheduling information of the physical downlink shared channel is transmitted on a primary component carrier of the first communications system; and in an uplink transmission timeslot of the first communications system, the fifth spectrum is used by the first communications system to transmit a physical uplink shared channel, scheduling information of the physical uplink shared channel is transmitted on the primary component carrier of the first communications system, and a downlink feedback for uplink data in the first communications system is transmitted on the primary component carrier of the first communications system.

With reference to the ninth possible implementation of the first aspect, in a tenth possible implementation, the method further includes:

in the downlink of the first communications system and the downlink of the second communications system, configuring, by the network control device, that a transmission timeslot of the second communications system and a transmission timeslot of the first communications system partially overlap, and that in the transmission timeslot of the first communications system, a time slice in which a downlink control channel of the first communications system is located and the transmission timeslot of the second communications system overlap, where the downlink control channel of the first communications system is transmitted on the primary component carrier of the first communications system within the time slice.

With reference to the ninth possible implementation of the first aspect, in an eleventh possible implementation, the method further includes:

in the downlink of the first communications system and the downlink of the second communications system, configuring, by the network control device, that a transmission timeslot of the second communications system and a transmission timeslot of the first communications system partially overlap, and that in the transmission timeslot of the first communications system, a partial time slice in which the physical downlink shared channel of the first communications system is located and the transmission timeslot of the second communications system overlap; and controlling the second communications system not to send a signal of the second communications system within a time slice overlapped between the partial time slice and the transmission timeslot of the second communications system.

According to a second aspect, a network control device is provided, where the network control device is located in a communications system including at least a first communications system and a second communications system, the network control device is a base station in the first communications system, or a central node configured to control a base station in the first communications system and a base station in the second communications system to perform resource coordination, and the network control device includes:

a monitoring unit, configured to obtain a network parameter of the first communications system;
a sharing unit, configured to configure a spectrum sharing manner between the first communications system and the second communications system and a spectrum sharing parameter according to the network parameter; and
a sending unit, configured to send a spectrum resource allocation message to the base station in the second communications system, where the spectrum resource allocation message includes the determined spectrum sharing manner and the spectrum sharing parameter, so that the base station in the second communications system shares a spectrum with the first communications system in the determined spectrum sharing manner; where
the network parameter includes at least one type of: distribution information of terminals with different capabilities in the first communications system or carrier quantity information of the base station in the first communications system;
the distribution information of terminals with different capabilities includes: a proportion or quantity of terminals in the first communications system that support carrier aggregation, distribution information of terminals in each cell that support carrier aggregation, a proportion or quantity of terminals that are in all terminals supporting carrier aggregation and that support cross-carrier scheduling, and distribution information of terminals in each cell that support cross-carrier scheduling; and
the spectrum sharing manner includes: a first sharing manner that does not support carrier aggregation, a second sharing manner that supports carrier aggregation, and a third sharing manner that supports both carrier aggregation and cross-carrier scheduling.

With reference to the second aspect, in a first possible implementation, the network control device is the central node or the base station in the first communications system; and when the network control device is the central node, the network control device further includes:

a receiving unit, configured to receive a spectrum allocation result from the base station in the second communications system, where
the sending unit is further configured to send the spectrum allocation result to the base station in the first communications system, so that the base station in the first communications system enables, according to the spectrum allocation result, the first communications system to perform spectrum sharing with the second communications system, where
the central node includes a single resource controller or an operation administration and maintenance device; or
when the network control device is the base station in the first communications system, the network control device further includes:
a receiving unit, configured to receive a spectrum allocation result from the base station in the second communications system; and
a processing unit, configured to enable, by the network control device according to the spectrum allocation result, the second communications system to perform spectrum sharing with the first communications system.

With reference to the first possible implementation of the second aspect, in a second possible implementation, that the sharing unit is specifically configured to configure the first sharing manner includes:

in a downlink of the first communications system and a downlink of the second communications system, the network control device configures, for a broadcast control channel of the second communications system, a first spectrum exclusive to the second communications system, and uses the first spectrum as an exclusive spectrum of the broadcast control channel; and
the network control device configures, as an exclusive spectrum of the first communications system, a second spectrum on which a common channel of the first communications system is located; and configures a third spectrum within downlink system bandwidth of the first communications system as a downlink shared spectrum of the first communications system and the second communications system, where the third spectrum is all or some spectrums, except the second spectrum, within the downlink system bandwidth of the first communications system; and
in an uplink of the first communications system and an uplink of the second communications system, the network control device configures, as an exclusive spectrum of the first communications system, a fourth spectrum on which an uplink control channel is located and that is within system bandwidth of the first communications system; and configures a fifth spectrum within uplink system bandwidth of the first communications system as an uplink shared spectrum of the first communications system and the second communications system, where the fifth spectrum is all or some spectrums, except the fourth spectrum, within the uplink system bandwidth of the first communications system.

With reference to the second possible implementation of the second aspect, in a third possible implementation, the first communications system and the second communications system use the third spectrum and the fifth spectrum in a time division manner;

in a downlink transmission timeslot of the second communications system, the third spectrum is used by the second communications system to transmit a physical downlink shared channel, the first spectrum is used by the second communications system to transmit the broadcast control channel, the second spectrum is used by the first communications system to transmit a downlink common channel, and the second spectrum is further used to transmit a downlink feedback for uplink data in the first communications system;

in a downlink transmission timeslot of the first communications system, the third spectrum is used by the first communications system to transmit a physical downlink shared channel, the first spectrum is used by the second communications system to transmit the broadcast control channel, the second spectrum is used by the first communications system to transmit the downlink common channel, and the second spectrum is used to transmit the downlink feedback for the uplink data in the first communications system;

in an uplink transmission timeslot of the second communications system, the fifth spectrum is used by the second communications system to transmit a physical uplink shared channel, and the fourth spectrum is used by the first communications system to transmit a physical uplink control channel; and in an uplink transmission timeslot of the first communications system, the fifth spectrum is used by the first communications system to transmit a physical uplink shared channel, and the fourth spectrum is used by the first communications system to transmit the physical uplink control channel.

With reference to the third possible implementation of the second aspect, in a fourth possible implementation, in the downlink transmission timeslot of the second communications system, the second spectrum is further used to transmit a physical downlink control channel of the first communications system, the second spectrum is further used to transmit the physical downlink shared channel, the third spectrum is further used to transmit a downlink pilot channel, and the second spectrum is further used by the first communications system to transmit a downlink feedback for uplink data of user equipment in an activated state;

in the downlink transmission timeslot of the first communications system, the third spectrum is further used by the first communications system to transmit the downlink pilot channel and the physical downlink shared channel, and the second spectrum is further used by the first communications system to transmit the downlink feedback for the uplink data of the user equipment in the activated state;

in the uplink transmission timeslot of the second communications system, the fifth spectrum is further used by the first communications system to transmit an uplink sounding signal; and in the uplink transmission timeslot of the first communications system, the fifth spectrum is further used by the first communications system to transmit the uplink sounding signal and the physical uplink shared channel.

With reference to the first possible implementation of the second aspect, in a fifth possible implementation, that the sharing unit is specifically configured to configure the second sharing manner includes:

in a downlink of the first communications system and a downlink of the second communications system, the network control device configures, for a broadcast control channel of the second communications system, a first spectrum exclusive to the second communications system, and uses the first spectrum as an exclusive spectrum of the broadcast control channel; and the network control device configures the first communications system to send a downlink primary synchronization channel and a downlink secondary synchronization channel on a second spectrum on which a synchronization channel of the first communications system is located, where a manner of sending the downlink primary synchronization channel and the downlink secondary synchronization channel includes at least one of the following manners:

the network control device configures the second spectrum as an exclusive spectrum of the first communications system, and configures a third spectrum within downlink system bandwidth of the first communications system as a downlink shared spectrum of the first communications system and the second communications system, where the third spectrum is all or some spectrums, except the second spectrum, within the downlink system bandwidth of the first communications system, and the downlink primary synchronization channel and the downlink secondary synchronization channel of the first communications system are sent on the second spectrum; or the network control device configures the second spectrum as an exclusive spectrum of the first communications system, and configures a third spectrum within downlink system bandwidth of the first communications system as a downlink shared spectrum of the first communications system and the second communications system, where the third spectrum is all or some spectrums, except the second spectrum, within the downlink system bandwidth of the first communications system, and the downlink primary synchronization channel and the downlink secondary synchronization channel of the first communications system are sent on the second spectrum only in a downlink transmission timeslot of the first communications system; or the network control device configures the second spectrum as an exclusive spectrum of the first communications system, and configures a third spectrum within downlink system bandwidth of the first communications system as a downlink shared spectrum of the first communications system and the second communications system, where the third spectrum is all or some spectrums, except the second spectrum, within the downlink system bandwidth of the first communications system, the network control device enables interference, caused by the first communications system to the second spectrum, to be lower than a preset threshold, and the downlink primary synchronization channel and the downlink secondary synchronization channel of the first communications system are sent on the second spectrum; and in an uplink of the first communications system and an uplink of the second communications system, the network control device configures a fifth spectrum within uplink system bandwidth of the first communications system as an uplink shared spectrum of the first communications system and the second communications system, where the fifth spectrum is all or some spectrum configurations within the uplink system bandwidth of the first communications system, where a downlink carrier of the third spectrum and an uplink carrier of the fifth spectrum are used to be configured as secondary component carriers for configuring carrier aggregation by the first communications system; and the first communications system and the second communications system use the third spectrum and the fifth spectrum in a time division manner.

With reference to the fifth possible implementation of the second aspect, in a sixth possible implementation, in a downlink transmission timeslot of the second communications system, the third spectrum is used by the second communications system to transmit a physical downlink shared channel, or the second spectrum is further used to transmit a downlink feedback for uplink data in the first communications system;

in the downlink transmission timeslot of the first communications system, the third spectrum is used by the first communications system to transmit a physical downlink shared channel, the first spectrum is used by the second communications system to transmit the broadcast control channel, the second spectrum is used to transmit the downlink feedback for the uplink data in the first communications system, and the second spectrum and the third spectrum are further used to transmit a physical downlink control channel in the downlink transmission timeslot;

in an uplink transmission timeslot of the second communications system, the fifth spectrum is used by the second communications system to transmit a physical uplink shared channel, and an uplink feedback that is for downlink data and is of user equipment in an activated state in the first communications system is transmitted on a primary component carrier of the first communications system; and in an uplink transmission timeslot of the first communications system, the fifth spectrum is used by the first communications system to transmit a physical uplink shared channel, the uplink feedback that is for the downlink data and is of the user equipment in the activated state in the first communications system is transmitted on the primary component carrier of the first communications system, and scheduling information of the physical uplink shared channel is transmitted on the second spectrum and the third spectrum.

With reference to the sixth possible implementation of the second aspect, in a seventh possible implementation, in the downlink transmission timeslot of the second communications system, the first communications system deactivates a carrier of the third spectrum used by the first communications system, and the first communications system does not transmit a downlink pilot channel on the fifth spectrum;

in the downlink transmission timeslot of the first communications system, the first communications system activates the carrier of the third spectrum used by the first communications system, and the fifth spectrum is further used by the first communications system to transmit the downlink pilot channel;

in the uplink transmission timeslot of the second communications system, the first communications system deactivates a carrier of the fifth spectrum used by the first communications system, and an uplink sounding signal of the first communications system is not transmitted on the fifth spectrum; and in the uplink transmission timeslot of the first communications system, the first communications system activates the carrier of the fifth spectrum used by the first communications system, and the fifth spectrum is further used to transmit the uplink sounding signal of the first communications system.

With reference to the fifth possible implementation of the second aspect, in an eighth possible implementation, in the downlink of the first communications system and the downlink of the second communications system, the network control device configures that a transmission timeslot of the second communications system and a transmission timeslot of the first communications system partially overlap, and controls not to send a signal of the second communications system within a time slice overlapped between the transmission timeslot of the second communications system and the transmission timeslot of the first communications system.

With reference to the fifth possible implementation of the second aspect, in a ninth possible implementation, that the sharing unit is specifically configured to configure the third sharing manner includes:

in the downlink of the first communications system and the downlink of the second communications system, the downlink carrier of the third spectrum and the uplink carrier of the fifth spectrum are used as secondary component carriers for configuring carrier aggregation by the first communications system;

in the downlink transmission timeslot of the first communications system, the third spectrum is used by the first communications system to transmit a physical downlink shared channel, and scheduling information of the physical downlink shared channel is transmitted on a primary component carrier of the first communications system; and in an uplink transmission timeslot of the first communications system, the fifth spectrum is used by the first communications system to transmit a physical uplink shared channel, scheduling information of the physical uplink shared channel is transmitted on the primary component carrier of the first communications system, and a downlink feedback for uplink data in the first communications system is transmitted on the primary component carrier of the first communications system.

With reference to the ninth possible implementation of the second aspect, in a tenth possible implementation, the network control device further includes: a control unit, configured to:

in the downlink of the first communications system and the downlink of the second communications system, configure, by the network control device, that a transmission timeslot of the second communications system and a transmission timeslot of the first communications system partially overlap, and that in the transmission timeslot of the first communications system, a time slice in which a downlink control channel of the first communications system is located and the transmission timeslot of the second communications system overlap, where the downlink control channel of the first communications system is transmitted on the primary component carrier of the first communications system within the time slice.

With reference to the ninth possible implementation of the second aspect, in an eleventh possible implementation, the network control device further includes: a control unit, configured to:

in the downlink of the first communications system and the downlink of the second communications system, configure, by the network control device, that a transmission timeslot of the second communications system and a transmission timeslot of the first communications system partially overlap, and that in the transmission timeslot of the first communications system, a partial time slice in which the physical downlink shared channel of the first communications system is located and the transmission timeslot of the second communications system overlap; and control the second communications system not to send a signal of the second communications system within a time slice overlapped between the partial time slice and the transmission timeslot of the second communications system.

According to a third aspect, a network control device is provided, where the network control device is located in a communications system including at least a first communications system and a second communications system, and the network control device is a base station in the first communications system, or a central node configured to control a base station in the first communications system and a base station in the second communications system to perform resource coordination; the network control device includes: a processor, a memory, and an interface; the processor, the memory, and the interface are connected by using a bus; the interface is configured to interact with another network element in the communications system; the memory is configured to store a computer program; the processor is configured to execute the computer program; and the processor executes the computer program to:
  obtain a network parameter of the first communications system;
  configure a spectrum sharing manner between the first communications system and the second communications system and a spectrum sharing parameter according to the network parameter; and
  send a spectrum resource allocation message to the base station in the second communications system, where the spectrum resource allocation message includes the determined spectrum sharing manner and the spectrum sharing parameter, so that the base station in the second communications system shares a spectrum with the first communications system in the determined spectrum sharing manner; where
  the network parameter includes at least one type of: distribution information of terminals with different capabilities in the first communications system or carrier quantity information of the base station in the first communications system;
  the distribution information of terminals with different capabilities includes: a proportion or quantity of terminals in the first communications system that support carrier aggregation, distribution information of terminals in each cell that support carrier aggregation, a proportion or quantity of terminals that are in all terminals supporting carrier aggregation and that support cross-carrier scheduling, and distribution information of terminals in each cell that support cross-carrier scheduling; and
  the spectrum sharing manner includes: a first sharing manner that does not support carrier aggregation, a second sharing manner that supports carrier aggregation, and a third sharing manner that supports both carrier aggregation and cross-carrier scheduling.

With reference to the third aspect, in a first possible implementation, the network control device is the central node or the base station in the first communications system; and when the network control device is the central node, the processor executes the computer program to specifically:
  receive a spectrum allocation result from the base station in the second communications system; and
  send the spectrum allocation result to the base station in the first communications system, so that the base station in the first communications system enables, according to the spectrum allocation result, the first communications system to perform spectrum sharing with the second communications system, where
the central node includes a single resource controller or an operation administration and maintenance device; or
when the network control device is the base station in the first communications system, the processor executes the computer program to specifically:
  receive a spectrum allocation result from the base station in the second communications system; and
  enable, by the network control device according to the spectrum allocation result, the second communications system to perform spectrum sharing with the first communications system.

With reference to the first possible implementation of the third aspect, in a second possible implementation, that the processor executes the computer program to configure the first sharing manner includes:
  in a downlink of the first communications system and a downlink of the second communications system, the network control device configures, for a broadcast control channel of the second communications system, a first spectrum exclusive to the second communications system, and uses the first spectrum as an exclusive spectrum of the broadcast control channel; and
  the network control device configures, as an exclusive spectrum of the first communications system, a second spectrum on which a common channel of the first communications system is located; and configures a third spectrum within downlink system bandwidth of the first communications system as a downlink shared spectrum of the first communications system and the second communications system, where the third spectrum is all or some spectrums, except the second spectrum, within the downlink system bandwidth of the first communications system; and
  in an uplink of the first communications system and an uplink of the second communications system, the network control device configures, as an exclusive spectrum of the first communications system, a fourth spectrum on which an uplink control channel is located and that is within system bandwidth of the first communications system; and configures a fifth spectrum within uplink system bandwidth of the first communications system as an uplink shared spectrum of the first communications system and the second communications system, where the fifth spectrum is all or some spectrums, except the fourth spectrum, within the uplink system bandwidth of the first communications system.

With reference to the second possible implementation of the third aspect, in a third possible implementation,
  the first communications system and the second communications system use the third spectrum and the fifth spectrum in a time division manner;
  in a downlink transmission timeslot of the second communications system, the third spectrum is used by the second communications system to transmit a physical downlink shared channel, the first spectrum is used by the second communications system to transmit the broadcast control channel, the second spectrum is used by the first communications system to transmit a downlink common channel, and the second spectrum is further used to transmit a downlink feedback for uplink data in the first communications system;

in a downlink transmission timeslot of the first communications system, the third spectrum is used by the first communications system to transmit a physical downlink shared channel, the first spectrum is used by the second communications system to transmit the broadcast control channel, the second spectrum is used by the first communications system to transmit the downlink common channel, and the second spectrum is used to transmit the downlink feedback for the uplink data in the first communications system;

in an uplink transmission timeslot of the second communications system, the fifth spectrum is used by the second communications system to transmit a physical uplink shared channel, and the fourth spectrum is used by the first communications system to transmit a physical uplink control channel; and in an uplink transmission timeslot of the first communications system, the fifth spectrum is used by the first communications system to transmit a physical uplink shared channel, and the fourth spectrum is used by the first communications system to transmit the physical uplink control channel.

With reference to the third possible implementation of the third aspect, in a fourth possible implementation, in the downlink transmission timeslot of the second communications system, the second spectrum is further used to transmit a physical downlink control channel of the first communications system, the second spectrum is further used to transmit the physical downlink shared channel, the third spectrum is further used to transmit a downlink pilot channel, and the second spectrum is further used by the first communications system to transmit a downlink feedback for uplink data of user equipment in an activated state;

in the downlink transmission timeslot of the first communications system, the third spectrum is further used by the first communications system to transmit the downlink pilot channel and the physical downlink shared channel, and the second spectrum is further used by the first communications system to transmit the downlink feedback for the uplink data of the user equipment in the activated state;

in the uplink transmission timeslot of the second communications system, the fifth spectrum is further used by the first communications system to transmit an uplink sounding signal; and in the uplink transmission timeslot of the first communications system, the fifth spectrum is further used by the first communications system to transmit the uplink sounding signal and the physical uplink shared channel.

With reference to the first possible implementation of the third aspect, in a fifth possible implementation, that the processor executes the computer program to configure the second sharing manner includes:

in a downlink of the first communications system and a downlink of the second communications system, the network control device configures, for a broadcast control channel of the second communications system, a first spectrum exclusive to the second communications system, and uses the first spectrum as an exclusive spectrum of the broadcast control channel; and the network control device configures the first communications system to send a downlink primary synchronization channel and a downlink secondary synchronization channel on a second spectrum on which a synchronization channel of the first communications system is located, where a manner of sending the downlink primary synchronization channel and the downlink secondary synchronization channel includes at least one of the following manners:

the network control device configures the second spectrum as an exclusive spectrum of the first communications system, and configures a third spectrum within downlink system bandwidth of the first communications system as a downlink shared spectrum of the first communications system and the second communications system, where the third spectrum is all or some spectrums, except the second spectrum, within the downlink system bandwidth of the first communications system, and the downlink primary synchronization channel and the downlink secondary synchronization channel of the first communications system are sent on the second spectrum; or the network control device configures the second spectrum as an exclusive spectrum of the first communications system, and configures a third spectrum within downlink system bandwidth of the first communications system as a downlink shared spectrum of the first communications system and the second communications system, where the third spectrum is all or some spectrums, except the second spectrum, within the downlink system bandwidth of the first communications system, and the downlink primary synchronization channel and the downlink secondary synchronization channel of the first communications system are sent on the second spectrum only in a downlink transmission timeslot of the first communications system; or the network control device configures the second spectrum as an exclusive spectrum of the first communications system, and configures a third spectrum within downlink system bandwidth of the first communications system as a downlink shared spectrum of the first communications system and the second communications system, where the third spectrum is all or some spectrums, except the second spectrum, within the downlink system bandwidth of the first communications system, the network control device enables interference, caused by the first communications system to the second spectrum, to be lower than a preset threshold, and the downlink primary synchronization channel and the downlink secondary synchronization channel of the first communications system are sent on the second spectrum; and in an uplink of the first communications system and an uplink of the second communications system, the network control device configures a fifth spectrum within uplink system bandwidth of the first communications system as an uplink shared spectrum of the first communications system and the second communications system, where the fifth spectrum is all or some spectrum configurations within the uplink system bandwidth of the first communications system, where a downlink carrier of the third spectrum and an uplink carrier of the fifth spectrum are used to be configured as secondary component carriers for configuring carrier aggregation by the first communications system; and the first communications system and the second communications system use the third spectrum and the fifth spectrum in a time division manner.

With reference to the fifth possible implementation of the third aspect, in a sixth possible implementation, in a downlink transmission timeslot of the second communications system, the third spectrum is used by the second communications system to transmit a physical downlink shared channel, or the second spectrum is further used to transmit a downlink feedback for uplink data in the first communications system;

in the downlink transmission timeslot of the first communications system, the third spectrum is used by the first communications system to transmit a physical downlink shared channel, the first spectrum is used by the second communications system to transmit the broadcast control channel, the second spectrum is used to transmit the downlink feedback for the uplink data in the first communications system, and the second spectrum and the third spectrum are further used to transmit a physical downlink control channel in the downlink transmission timeslot;

in an uplink transmission timeslot of the second communications system, the fifth spectrum is used by the second communications system to transmit a physical uplink shared channel, and an uplink feedback that is for downlink data and is of user equipment in an activated state in the first communications system is transmitted on a primary component carrier of the first communications system; and in an uplink transmission timeslot of the first communications system, the fifth spectrum is used by the first communications system to transmit a physical uplink shared channel, the uplink feedback that is for the downlink data and is of the user equipment in the activated state in the first communications system is transmitted on the primary component carrier of the first communications system, and scheduling information of the physical uplink shared channel is transmitted on the second spectrum and the third spectrum.

With reference to the sixth possible implementation of the third aspect, in a seventh possible implementation, in the downlink transmission timeslot of the second communications system, the first communications system deactivates a carrier of the third spectrum used by the first communications system, and the first communications system does not transmit a downlink pilot channel on the fifth spectrum;

in the downlink transmission timeslot of the first communications system, the first communications system activates the carrier of the third spectrum used by the first communications system, and the fifth spectrum is further used by the first communications system to transmit the downlink pilot channel;

in the uplink transmission timeslot of the second communications system, the first communications system deactivates a carrier of the fifth spectrum used by the first communications system, and an uplink sounding signal of the first communications system is not transmitted on the fifth spectrum; and in the uplink transmission timeslot of the first communications system, the first communications system activates the carrier of the fifth spectrum used by the first communications system, and the fifth spectrum is further used to transmit the uplink sounding signal of the first communications system.

With reference to the fifth possible implementation of the third aspect, in an eighth possible implementation, in the downlink of the first communications system and the downlink of the second communications system, the network control device configures that a transmission timeslot of the second communications system and a transmission timeslot of the first communications system partially overlap, and controls not to send a signal of the second communications system within a time slice overlapped between the transmission timeslot of the second communications system and the transmission timeslot of the first communications system.

With reference to the fifth possible implementation of the third aspect, in a ninth possible implementation, in the downlink of the first communications system and the downlink of the second communications system, the downlink carrier of the third spectrum and the uplink carrier of the fifth spectrum are used as secondary component carriers for configuring carrier aggregation by the first communications system;

in the downlink transmission timeslot of the first communications system, the third spectrum is used by the first communications system to transmit a physical downlink shared channel, and scheduling information of the physical downlink shared channel is transmitted on a primary component carrier of the first communications system; and in an uplink transmission timeslot of the first communications system, the fifth spectrum is used by the first communications system to transmit a physical uplink shared channel, scheduling information of the physical uplink shared channel is transmitted on the primary component carrier of the first communications system, and a downlink feedback for uplink data in the first communications system is transmitted on the primary component carrier of the first communications system.

With reference to the ninth possible implementation of the third aspect, in a tenth possible implementation, the processor executes the computer program to further:

in the downlink of the first communications system and the downlink of the second communications system, configure, by the network control device, that a transmission timeslot of the second communications system and a transmission timeslot of the first communications system partially overlap, and that in the transmission timeslot of the first communications system, a time slice in which a downlink control channel of the first communications system is located and the transmission timeslot of the second communications system overlap, where the downlink control channel of the first communications system is transmitted on the primary component carrier of the first communications system within the time slice.

With reference to the ninth possible implementation of the third aspect, in an eleventh possible implementation, the processor executes the computer program to further:

in the downlink of the first communications system and the downlink of the second communications system, configure, by the network control device, that a transmission timeslot of the second communications system and a transmission timeslot of the first communications system partially overlap, and that in the transmission timeslot of the first communications system, a partial time slice in which the physical downlink shared channel of the first communications system is located and the transmission timeslot of the second communications system overlap; and control the second communications system not to send a signal of the second communications system within a time slice overlapped between the partial time slice and the transmission timeslot of the second communications system.

According to the radio resource sharing method and the device that are provided in the embodiments of the present disclosure, first, a network control device obtains a network parameter of a first communications system, and configures a spectrum sharing manner between the first communications system and a second communications system according to the network parameter; and next, sends a spectrum resource allocation message to a base station in the second communications system. The spectrum resource allocation message includes the determined spectrum sharing manner and information about a spectrum resource allocated to the second communications system. In this way, inter-system spectrum sharing can be implemented in different network statuses.

BRIEF DESCRIPTION OF DRAWINGS

To describe technical solutions in embodiments of the present disclosure more clearly, the following briefly describes accompanying drawings required for describing the embodiments. Apparently, the accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

It should be understood that in the technical solutions provided in the embodiments of the present disclosure, a network control device is located in a communications system including a first communications system and a second communications system. The network control device is a base station in the first communications system, or a central node configured to control a base station in the first communications system and a base station in the second communications system to perform resource coordination. It should be noted that, the first communications system and the second communications system may be respectively a Long Term Evolution (LTE) system and a Global System for Mobile Communications system (GSM). The network control device may be a central node in an entire communications network, for example, a single resource controller (SRC) or an operation administration and maintenance (OAM) device. Alternatively, the network control device may be a base station in the LTE system, and the base station may be an eNB (evolved NodeB). In addition, the foregoing uses only the LTE system and the GSM system as examples. In addition, a method in the embodiments may be applied to another system.

Figure 1:
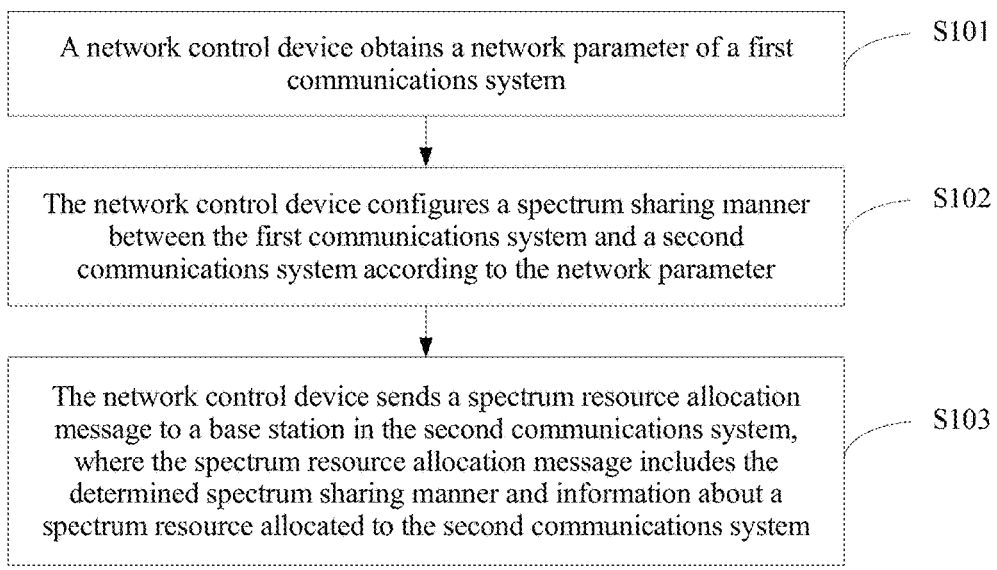
FIG. 1 is a schematic flowchart of a radio resource sharing method according to an embodiment of the present disclosure.

An embodiment of the present disclosure provides a radio resource sharing method. As shown in FIG. 1, the method includes the following steps.

S101. A network control device obtains a network parameter of a first communications system.

The network parameter of the first communications system may include at least one type of: distribution information of terminals with different capabilities in the first communications system or carrier quantity information of a base station in the first communications system.

The distribution information of terminals with different capabilities includes: a proportion or quantity of terminals in the first communications system that support carrier aggregation, distribution information of terminals in each cell that support carrier aggregation, a proportion or quantity of terminals that are in all terminals supporting carrier aggregation and that support cross-carrier scheduling, and distribution information of terminals in each cell that support cross-carrier scheduling.

S102. The network control device configures a spectrum sharing manner between the first communications system and a second communications system according to the network parameter.

The spectrum sharing manner includes: a first sharing manner that does not support carrier aggregation, a second sharing manner that supports carrier aggregation, and a third sharing manner that supports both carrier aggregation and cross-carrier scheduling.

Specifically, selecting which one of the sharing manners needs to depend on the terminal capability distribution information and the carrier quantity information of the base station.

S103. The network control device sends a spectrum resource allocation message to a base station in the second communications system, where the spectrum resource allocation message includes the determined spectrum sharing manner and information about a spectrum resource allocated to the second communications system.

According to the radio resource sharing method provided in this embodiment of the present disclosure, first, a network control device obtains a network parameter of a first communications system, and configures a spectrum sharing manner between the first communications system and a second communications system according to the network parameter; and next, sends a spectrum resource allocation message to a base station in the second communications system. The spectrum resource allocation message includes the determined spectrum sharing manner and information about a spectrum resource allocated to the second communications system. In this way, inter-system spectrum sharing can be implemented in different network statuses.

Figure 2:
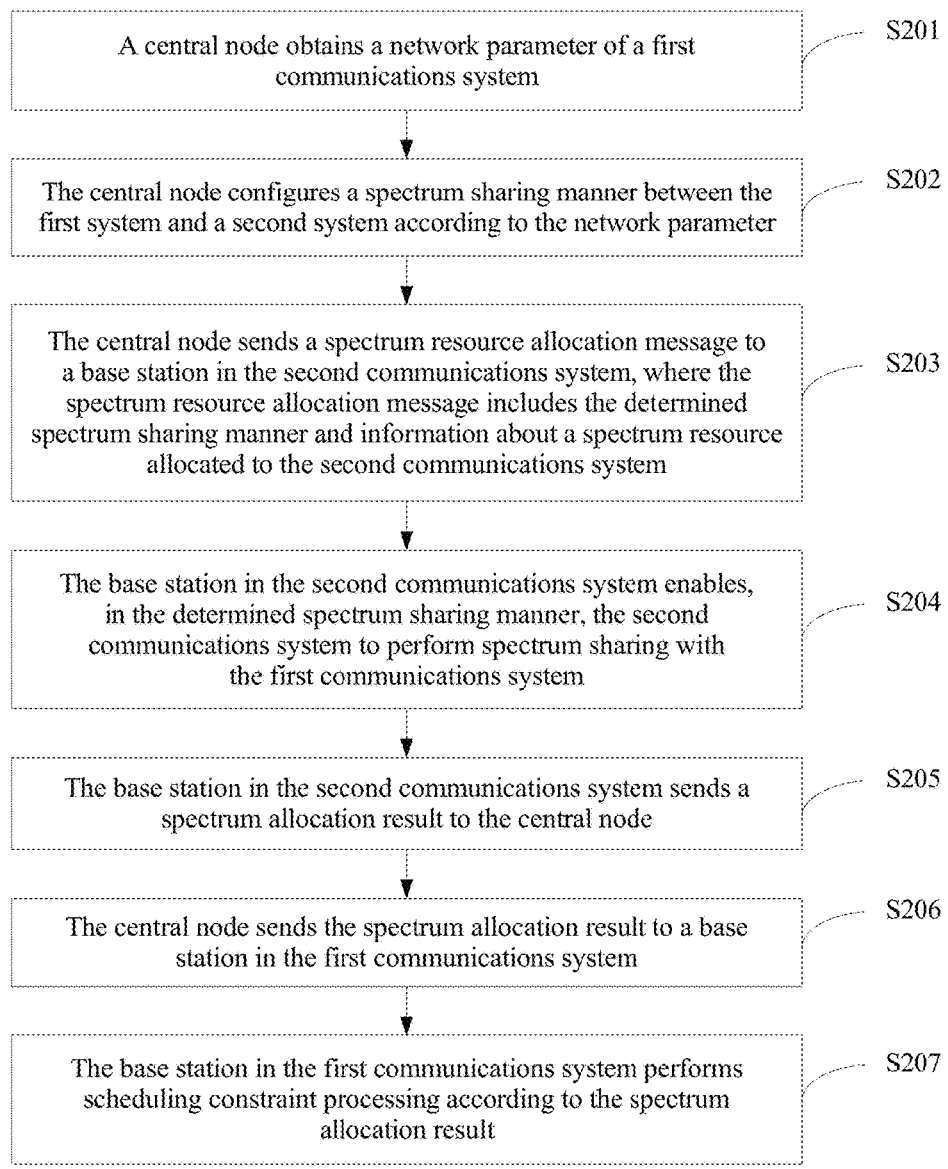
FIG. 2 is another schematic flowchart of a radio resource sharing method according to an embodiment of the present disclosure.

To make persons skilled in the art more clearly understand the technical solutions provided in the embodiments of the present disclosure, by using specific embodiments, the following describes in detail a radio resource sharing method provided in an embodiment of the present disclosure. As shown in FIG. 2, when a network control device is a central node such as an SRC or OAM, the method includes the following steps.

S201. The central node obtains a network parameter of a first communications system.

Specifically, the network parameter may be at least one type of: distribution information of terminals with different capabilities in the first communications system or carrier quantity information of a base station in the first communications system.

The distribution information of terminals with different capabilities includes: a proportion or quantity of terminals in the first communications system that support carrier aggregation (CA), distribution information of terminals in each cell that support carrier aggregation, a proportion or quantity of terminals that are in all terminals supporting carrier aggregation and that support cross-carrier scheduling, and distribution information (for example, location information) of terminals in each cell that support cross-carrier scheduling.

202. The central node configures a spectrum sharing manner between the first communications system and a second communications system according to the network parameter.

The spectrum sharing manner includes: a first sharing manner that does not support carrier aggregation, a second sharing manner that supports carrier aggregation, and a third sharing manner that supports both carrier aggregation and cross-carrier scheduling.

Specifically, in a first case, that the network control device configures the first sharing manner may include the following content.

In a downlink of the first communications system and a downlink of the second communications system (in this embodiment of the present disclosure, a downlink of a communications system may be understood as transmission from a base station in the communications system to user equipment, and an uplink may be understood as transmission from the user equipment to the base station in the communications system), the network control device configures, for a broadcast control channel (BCCH) of the second communications system, a first spectrum exclusive to the second communications system, and uses the first spectrum as an exclusive spectrum of the BCCH.

The network control device configures, as an exclusive spectrum of the first communications system, a second spectrum on which a common channel (CCH) of the first communications system is located; and configures a third spectrum within downlink system bandwidth of the first communications system as a downlink shared spectrum of the first communications system and the second communications system. The third spectrum is all or some spectrums, except the second spectrum, within the downlink system bandwidth of the first communications system.

In an uplink of the first communications system and an uplink of the second communications system, the network control device configures, as an exclusive spectrum of the first communications system, a fourth spectrum on which an uplink control channel is located and that is within system bandwidth of the first communications system; and configures a fifth spectrum within uplink system bandwidth of the first communications system as an uplink shared spectrum of the first communications system and the second communications system. The fifth spectrum is all or some spectrums, except the fourth spectrum, within the uplink system bandwidth of the first communications system.

For ease of description, an example that the first communications system and the second communications system in this embodiment are respectively an LTE system and a GSM system is used for description. For example, a spectrum structure in the first sharing manner may be shown in FIG. 3. A spectrum of a BCCH is marked as the first spectrum, and the second spectrum exclusive to the LTE system may also be referred to as a central spectrum, and is used as an exclusive spectrum of the LTE system. The second spectrum is a spectrum within a specific range in the middle of the third spectrum in the diagram, and is generally a 1.08 MHz spectrum in the middle. The 1.08 MHz is usually configured to a common channel of the LTE. The common channel may include a primary synchronization channel (P-SCH), a secondary synchronization channel (S-SCH), a physical hybrid automatic repeat request (HARQ) indicator channel, e.g. Physical HARQ Indicator Channel(PHICH), a physical format configuration indicator channel (PCFICH), a physical broadcast channel (PBCH), and the like. Because most basic configuration information of an LTE cell is carried on these channels, interference from the GSM system needs to be avoided. Therefore, the 1.08 MHz spectrum is configured as the exclusive spectrum of the LTE system. The third spectrum is on either side of the second spectrum.

Figure 3:
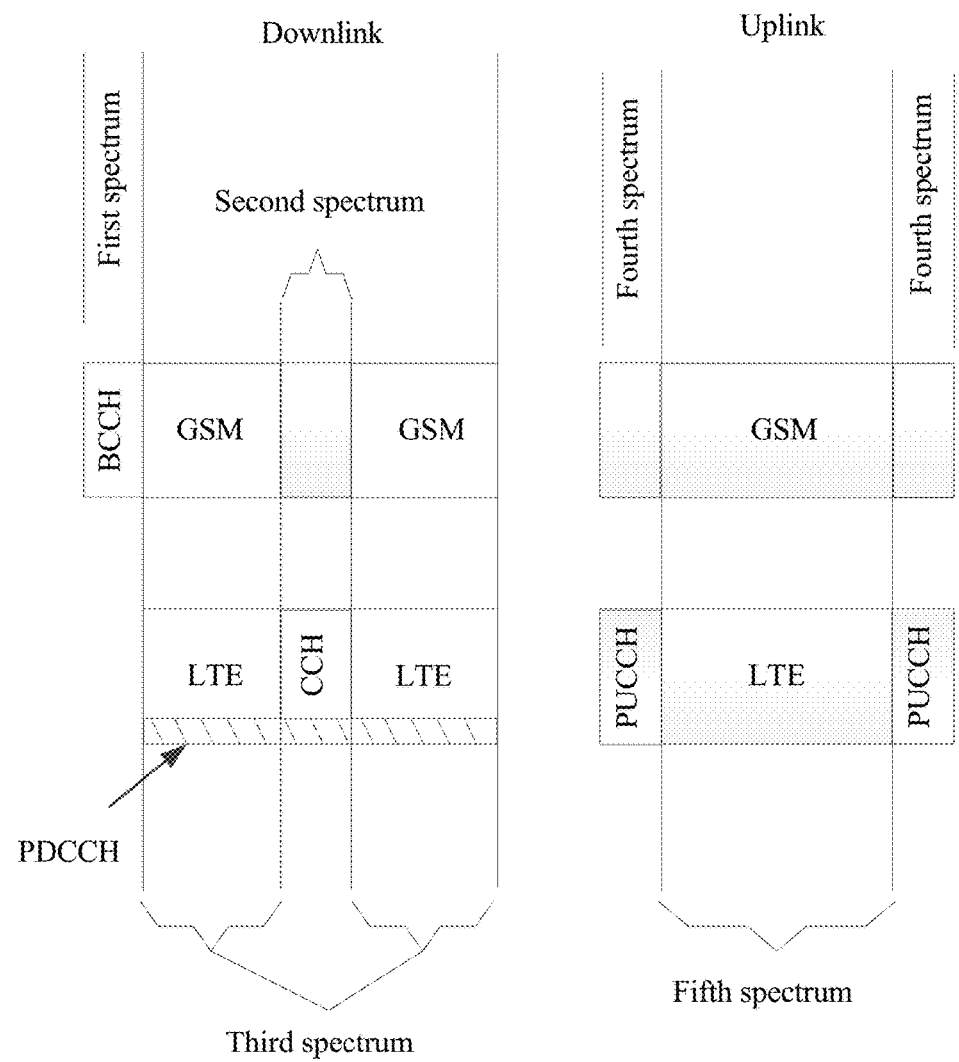
FIG. 3 is a schematic diagram of a spectrum structure in a first sharing manner of a radio resource sharing method according to an embodiment of the present disclosure.

In addition, the first spectrum, the second spectrum, and the third spectrum may be contiguous, or may be discrete (contiguous in FIG. 3).

It should be noted that in the following embodiments of the present disclosure, transmitting a channel is a term commonly used by persons skilled in the art, and the transmitting a channel is actually transmitting information (data or signaling) carried on the channel. For example, uplink data is usually transmitted on a physical uplink shared channel (PUSCH). Therefore, the uplink data is usually replaced with the PUSCH. For example, transmitting uplink data may be referred to as transmitting a PUSCH, and transmitting a downlink feedback for uplink data may be referred to as transmitting a downlink feedback for a PUSCH.

When the spectrum resources obtained by means of division are used, interference may be avoided by using scheduling coordination between the two standards: the GSM system and the LTE system. The coordination may be coordination performed in a frequency domain, or may be coordination performed in a time domain. For example, the first communications system and the second communications system use the third spectrum and the fifth spectrum in a time division manner.

In a downlink transmission timeslot of the second communications system, the third spectrum is used by the second communications system to transmit a physical downlink shared channel (PDSCH) that may also be referred to as a downlink data channel. The first spectrum is used by the second communications system to transmit the BCCH. The second spectrum is used by the first communications system to transmit a downlink CCH. The second spectrum is further used to transmit a downlink feedback for uplink data in the first communications system.

In a downlink transmission timeslot of the first communications system, the third spectrum is used by the first communications system to transmit a physical downlink shared channel (PDCCH). The first spectrum is used by the second communications system to transmit the BCCH. The second spectrum is used by the first communications system to transmit the downlink CCH. The second spectrum is used to transmit the downlink feedback for the PDSCH in the first communications system.

In an uplink transmission timeslot of the second communications system, the fifth spectrum is used by the second communications system to transmit a PUSCH. The fourth spectrum is used by the first communications system to transmit a physical uplink control channel (PUCCH).

In an uplink transmission timeslot of the first communications system, the fifth spectrum is used by the first communications system to transmit a PUSCH. The fourth spectrum is used by the first communications system to transmit the PUCCH.

Optionally,
in the downlink transmission timeslot of the second communications system, the second spectrum is further used to transmit a PDCCH of the first communications system. The second spectrum is further used to transmit the PDSCH. The third spectrum is further used to transmit a downlink pilot, e.g. cell-specific reference signal (CRS). Alternatively, a downlink CRS may not be transmitted in a timeslot of the second communications system. Specifically, a load status of the second communications system in the timeslot of the second communications system needs to be considered. The second spectrum is further used by the first communications system to transmit a downlink feedback for uplink data of user equipment in an activated state.

In the downlink transmission timeslot of the first communications system, the third spectrum is further used by the first communications system to transmit the downlink CRS and the PDSCH. The second spectrum is further used by the first communications system to transmit the downlink feedback for the uplink data of the user equipment in the activated state.

In the uplink transmission timeslot of the second communications system, the fifth spectrum is further used by the first communications system to transmit an uplink sounding reference signal (Sounding RS).

In the uplink transmission timeslot of the first communications system, the fifth spectrum is further used by the first communications system to transmit the uplink sounding signal and the PUSCH.

Figure 4:
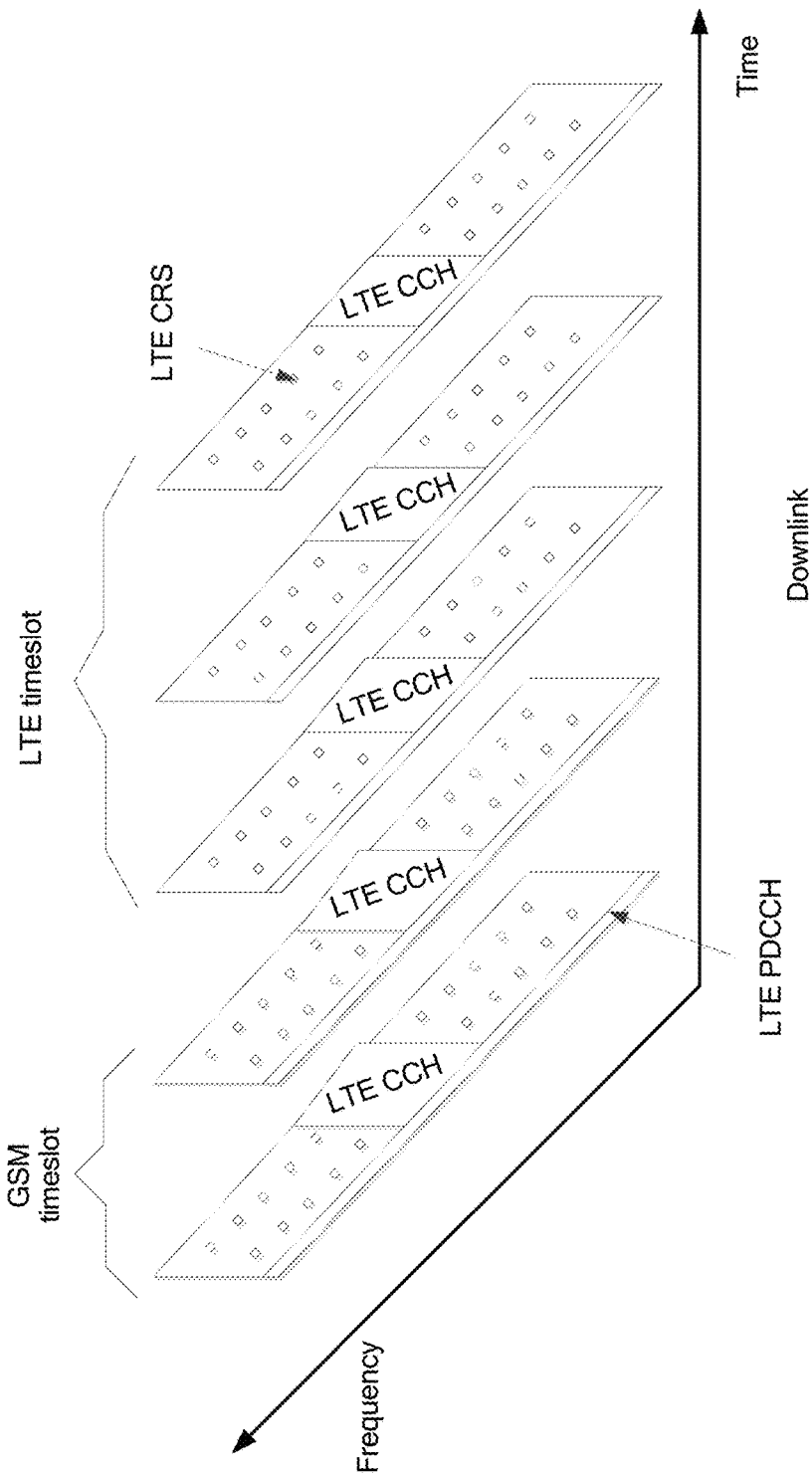
FIG. 4 is a schematic diagram of downlink transmission performed when a first sharing manner of a radio resource sharing method is used according to an embodiment of the present disclosure.
Figure 5:
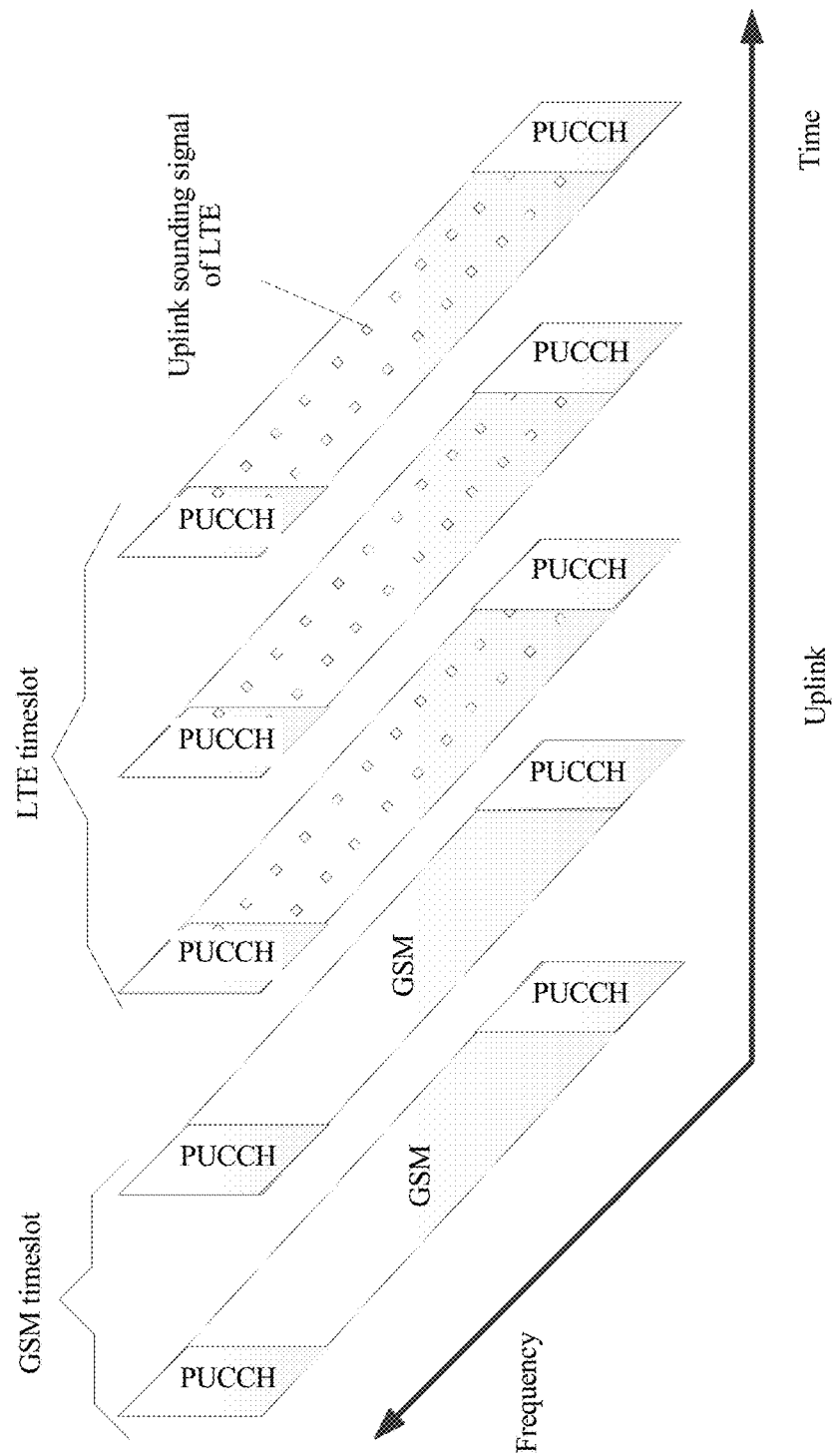
FIG. 5 is a schematic diagram of uplink transmission performed when a first sharing manner of a radio resource sharing method is used according to an embodiment of the present disclosure.

To describe the method more clearly, as shown in FIG. 4 and FIG. 5, an example that the first communications system and the second communications system are respectively an LTE system and a GSM system is used for description.

As shown in FIG. 4, in a downlink transmission timeslot of the GSM,
the third spectrum is used by the GSM system to transmit a PDSCH that may also be referred to as a downlink data channel, e.g. Traffic Channel (TCH). The first spectrum is used by the GSM system to transmit a BCCH. The second spectrum is used by the LTE system to transmit a CCH.

Optionally, the third spectrum may be further used to transmit a downlink pilot channel CRS of the LTE system. Alternatively, a CRS may not be transmitted in a GSM timeslot. Specifically, a load status of the GSM system in the GSM timeslot needs to be considered. The central spectrum may be further used by the LTE system to transmit a downlink feedback for uplink data of a user in an activated state.

Optionally, when load of the GSM system is not high, the entire second spectrum may be used to transmit a PDCCH of the LTE system (in FIG. 3 and FIG. 4, a shadow is used to indicate that the PDCCH is optional). In this case, the second spectrum that is a 1.08 MHz spectrum resource may also be used to transmit a PDSCH of the LTE system.

In a downlink transmission timeslot of the LTE,
the entire second spectrum and third spectrum may be used by the LTE system to transmit the PDSCH and the PDCCH.

Optionally, in the downlink transmission timeslot of the LTE, the third spectrum is further used to transmit a CRS.

During downlink transmission, to improve spectrum utilization, a transmission timeslot of the LTE and a transmission timeslot of the GSM may be configured to be partially overlapped. When a downlink timeslot of the LTE and a downlink timeslot of the GSM partially overlap, a downlink signal of the GSM is not sent in an overlapped part, so as to prevent the signal of the GSM from interfering with downlink data or control information of the LTE.

As shown in FIG. 5, in an uplink transmission timeslot of the GSM, the fifth spectrum is used by the GSM system to transmit a PUSCH that may also be referred to as an uplink TCH. A spectrum on either side of the fifth spectrum is used by the LTE system to transmit a PUCCH. The spectrum on either side of the fifth spectrum is further used to transmit an uplink feedback that is for downlink data and is of a user in an activated state.

Optionally, the fifth spectrum is further used by the LTE system to transmit an uplink sounding signal (Sounding RS). Alternatively, an uplink sounding signal may not be transmitted. Specifically, a load status of the GSM system in a GSM timeslot needs to be considered.

In an uplink transmission timeslot of the LTE, the fifth spectrum is used by the LTE system to transmit a PUSCH. The spectrum on either side of the fifth spectrum is used by the LTE system to transmit the PUCCH.

Optionally, the uplink shared spectrum is further used by the LTE system to transmit the uplink sounding signal.

In a second case, that the network control device configures the second sharing manner may include the following content.

In a downlink of the first communications system and a downlink of the second communications system, the network control device configures, to a BCCH of the second communications system, a first spectrum exclusive to the second communications system, and uses the first spectrum as an exclusive spectrum of the BCCH.

The network control device configures the first communications system to send a downlink primary synchronization channel and a downlink secondary synchronization channel on a second spectrum on which a synchronization channel of the first communications system is located. A manner of sending the downlink primary synchronization channel and the downlink secondary synchronization channel includes at least one of the following manners:

the network control device configures the second spectrum as an exclusive spectrum of the first communications system, and configures a third spectrum within downlink system bandwidth of the first communications system as a downlink shared spectrum of the first communications system and the second communications system, where the third spectrum is all or some spectrums, except the second spectrum, within the downlink system bandwidth of the first communications system, and the downlink primary synchronization channel and the downlink secondary synchronization channel of the first communications system are sent on the second spectrum; or the network control device configures the second spectrum as an exclusive spectrum of the first communications system, and configures a third spectrum within downlink system bandwidth of the first communications system as a downlink shared spectrum of the first communications system and the second communications system, where the third spectrum is all or some spectrums, except the second spectrum, within the downlink system bandwidth of the first communications system, and the downlink primary synchronization channel and the downlink secondary synchronization channel of the first communications system are sent on the second spectrum only in a downlink transmission timeslot of the first communications system; or the network control device configures the second spectrum as an exclusive spectrum of the first communications system, and configures a third spectrum within downlink system bandwidth of the first communications system as a downlink shared spectrum of the first communications system and the second communications system, where the third spectrum is all or some spectrums, except the second spectrum, within the downlink system bandwidth of the first communications system, the network control device enables interference, caused by the first communications system to the second spectrum, to be lower than a preset threshold, the downlink primary synchronization channel and the downlink secondary synchronization channel of the first communications system are sent on the second spectrum, and the network control device may avoid, by means of planning, the interference caused by the first communications system to the second spectrum, so that the interference is lower than the preset threshold.

In an uplink of the first communications system and an uplink of the second communications system, the network control device configures a fifth spectrum within uplink system bandwidth of the first communications system as an uplink shared spectrum of the first communications system and the second communications system. The fifth spectrum is all or some spectrum configurations within the uplink system bandwidth of the first communications system.

A downlink carrier of the third spectrum and an uplink carrier of the fifth spectrum are used to be configured as secondary component carriers for configuring carrier aggregation by the first communications system. It may be understood that, the first communications system may configure the downlink carrier of the third spectrum and the uplink carrier of the fifth spectrum as secondary component carriers for carrier aggregation.

The first communications system and the second communications system use the third spectrum and the fifth spectrum in a time division manner.

An example that the first communications system and the second communications system are respectively an LTE system and a GSM system is used. A spectrum structure in the second sharing manner may be shown in FIG. 6 and FIG. 7.

Figure 6:
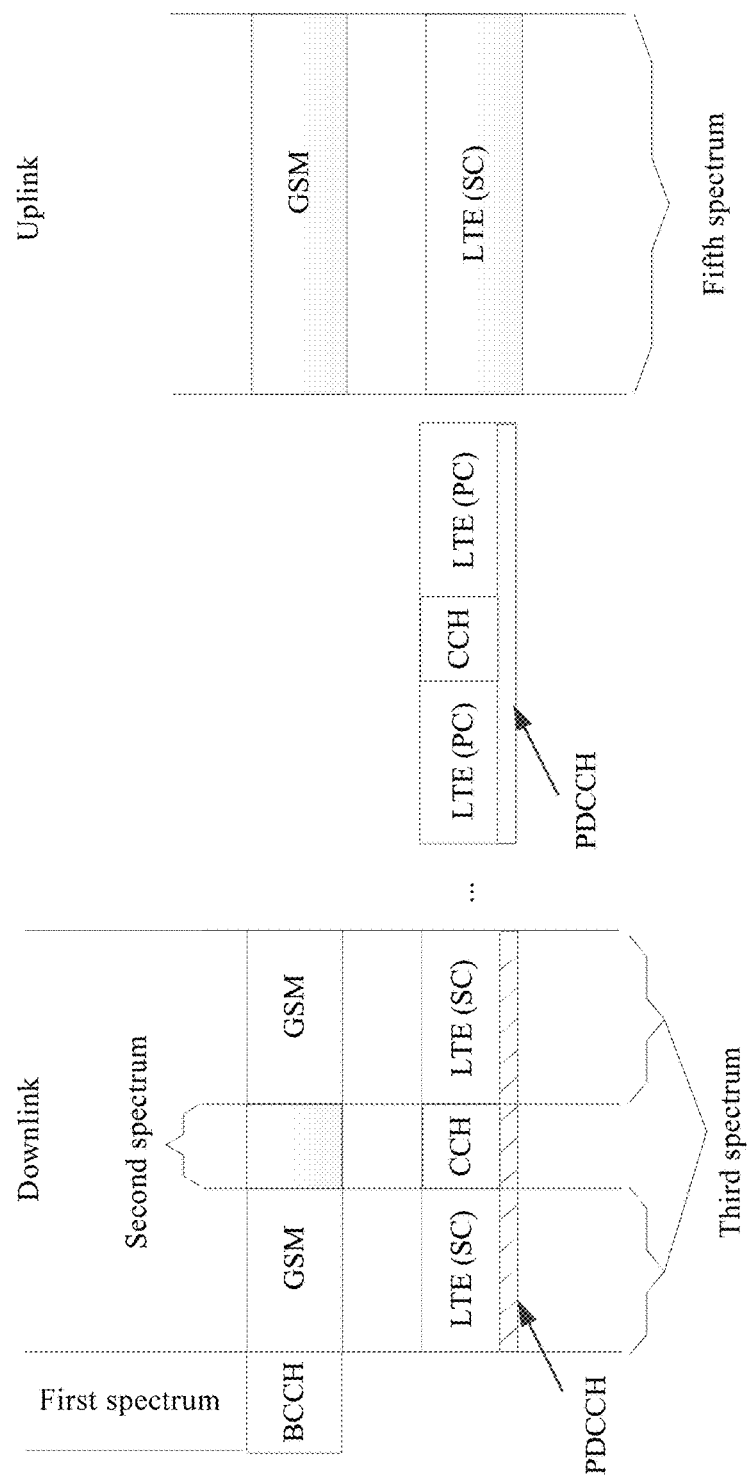
FIG. 6 is a schematic diagram of a spectrum structure in a second sharing manner of a radio resource sharing method according to an embodiment of the present disclosure.

In terms of frequency, the first spectrum, the second spectrum, and the third spectrum may be contiguous, or may be discrete (contiguous in FIG. 6).

The second spectrum sharing manner is the same as the first sharing manner. The second spectrum is configured to the LTE system, and is used as an exclusive spectrum of the LTE system. The second spectrum is also referred to as a central spectrum. The second spectrum is a spectrum within a specific range in the middle of the third spectrum in the diagram, and is generally a 1.08 MHz spectrum in the middle. The 1.08 MHz is usually configured to a common channel of the LTE. The common channel may include a PSS, an SSS, an HARQ PHICH, a PCFICH, a PBCH, and the like. A spectrum on either side of the second spectrum is used as a downlink shared spectrum (secondary component carrier (SCC) of the GSM system and the LTE system.

As shown in FIG. 6, a primary component carrier (PCC) spectrum of the LTE system is further included. A central spectrum (1.08 MHz) of the primary component carrier spectrum is also used by the LTE system to transmit a CCH.

The entire primary component carrier spectrum may be used by the LTE system to transmit a PDCCH.

Figure 7:
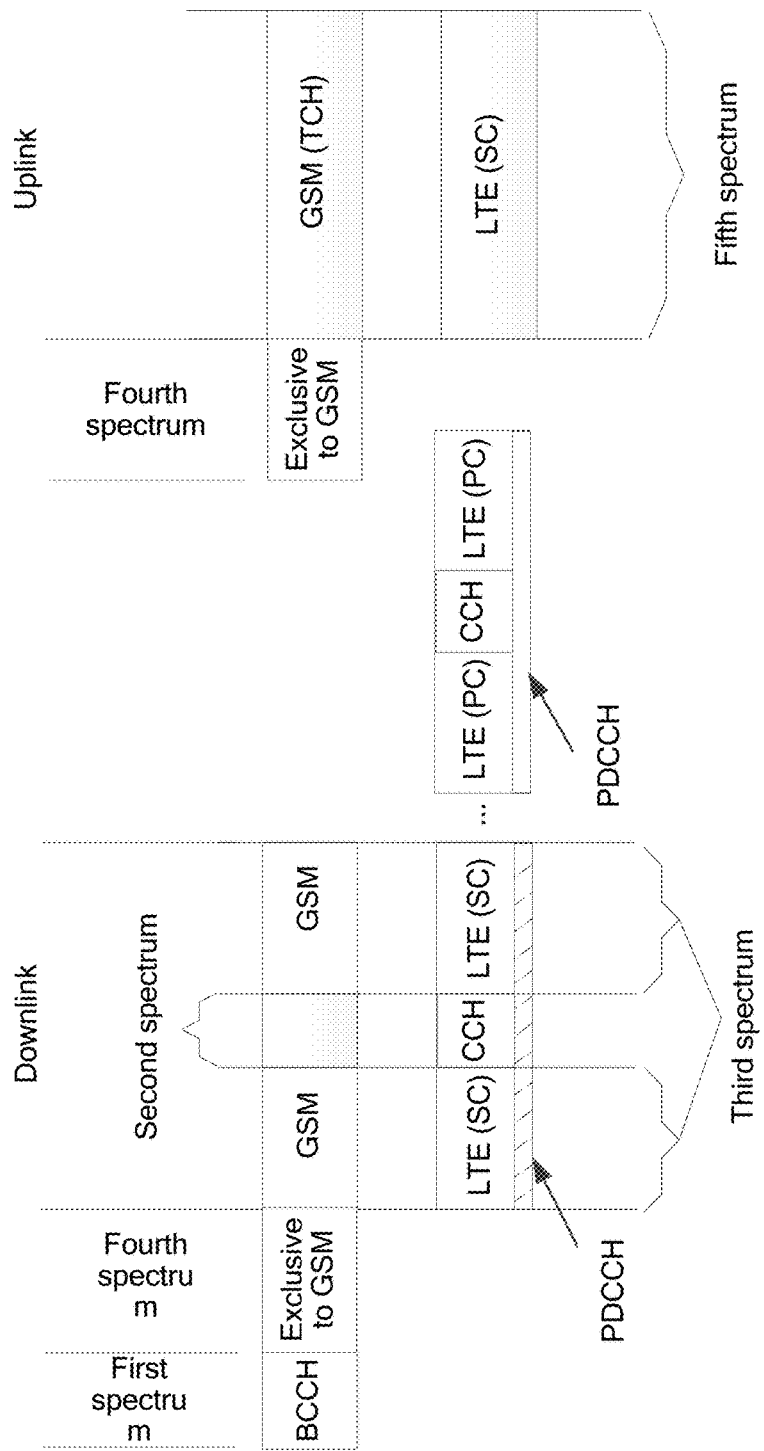
FIG. 7 is a schematic diagram of another spectrum structure in a second sharing manner of a radio resource sharing method according to an embodiment of the present disclosure.

Optionally, as shown in FIG. 7, during downlink transmission, a fourth spectrum may further exist between the first spectrum and the third spectrum. The fourth spectrum is also an exclusive spectrum of the GSM system, and may be used to transmit a BCCH and a downlink TCH.

Likewise, when the spectrum resources obtained by means of division are used, interference may be avoided by using coordination in a frequency domain or using coordination in a time domain. For example, the first communications system and the second communications system use the third spectrum and the fifth spectrum in a time division manner.

In a downlink transmission timeslot of the second communications system, the third spectrum is used by the second communications system to transmit a PDSCH. Optionally, when load of the second communications system is not high, both the second spectrum and the third spectrum may be used to transmit a PDCCH of the first communications system. In this case, the second spectrum may be further used to transmit a downlink feedback for uplink data in the first communications system.

In the downlink transmission timeslot of the first communications system, the third spectrum is used by the first communications system to transmit a PDSCH. The first spectrum is used by the second communications system to transmit the BCCH. The second spectrum is used to transmit the downlink feedback for the uplink data in the first communications system. The second spectrum and the third spectrum are further used to transmit the PDCCH in the downlink transmission timeslot.

In an uplink transmission timeslot of the second communications system, the fifth spectrum is used by the second communications system to transmit a PUSCH. An uplink feedback that is for downlink data and is of user equipment in an activated state in the first communications system is transmitted on a primary component carrier of the first communications system.

In an uplink transmission timeslot of the first communications system, the fifth spectrum is used by the first communications system to transmit a PUSCH. The uplink feedback that is for the downlink data and is of the user equipment in the activated state in the first communications system is transmitted on the primary component carrier of the first communications system. Scheduling information of the PUSCH is transmitted on the second spectrum and the third spectrum.

Optionally,
in the downlink transmission timeslot of the second communications system, the first communications system deactivates a carrier of the third spectrum used by the first communications system. The first communications system does not transmit a downlink pilot channel on the fifth spectrum.

In the downlink transmission timeslot of the first communications system, the first communications system activates the carrier of the third spectrum used by the first communications system. The fifth spectrum is further used by the first communications system to transmit the CRS. Specifically, a load status of the second communications system in a timeslot of the second communications system needs to be considered for choosing to transmit a downlink CRS or not to transmit a downlink CRS.

In the uplink transmission timeslot of the second communications system, the first communications system deactivates a carrier of the fifth spectrum used by the first communications system. An uplink sounding reference signal (Sounding RS) of the first communications system is not transmitted on the fifth spectrum.

In the uplink transmission timeslot of the first communications system, the first communications system activates the carrier of the fifth spectrum used by the first communications system. The fifth spectrum is further used to transmit the uplink sounding signal of the first communications system. Specifically, a load status of the second communications system in a timeslot of the second communications system needs to be considered for choosing to transmit an uplink sounding signal or not to transmit an uplink sounding signal.

The PDCCH of the first communications system may be transmitted on the primary component carrier of the first communications system.

Figure 8:
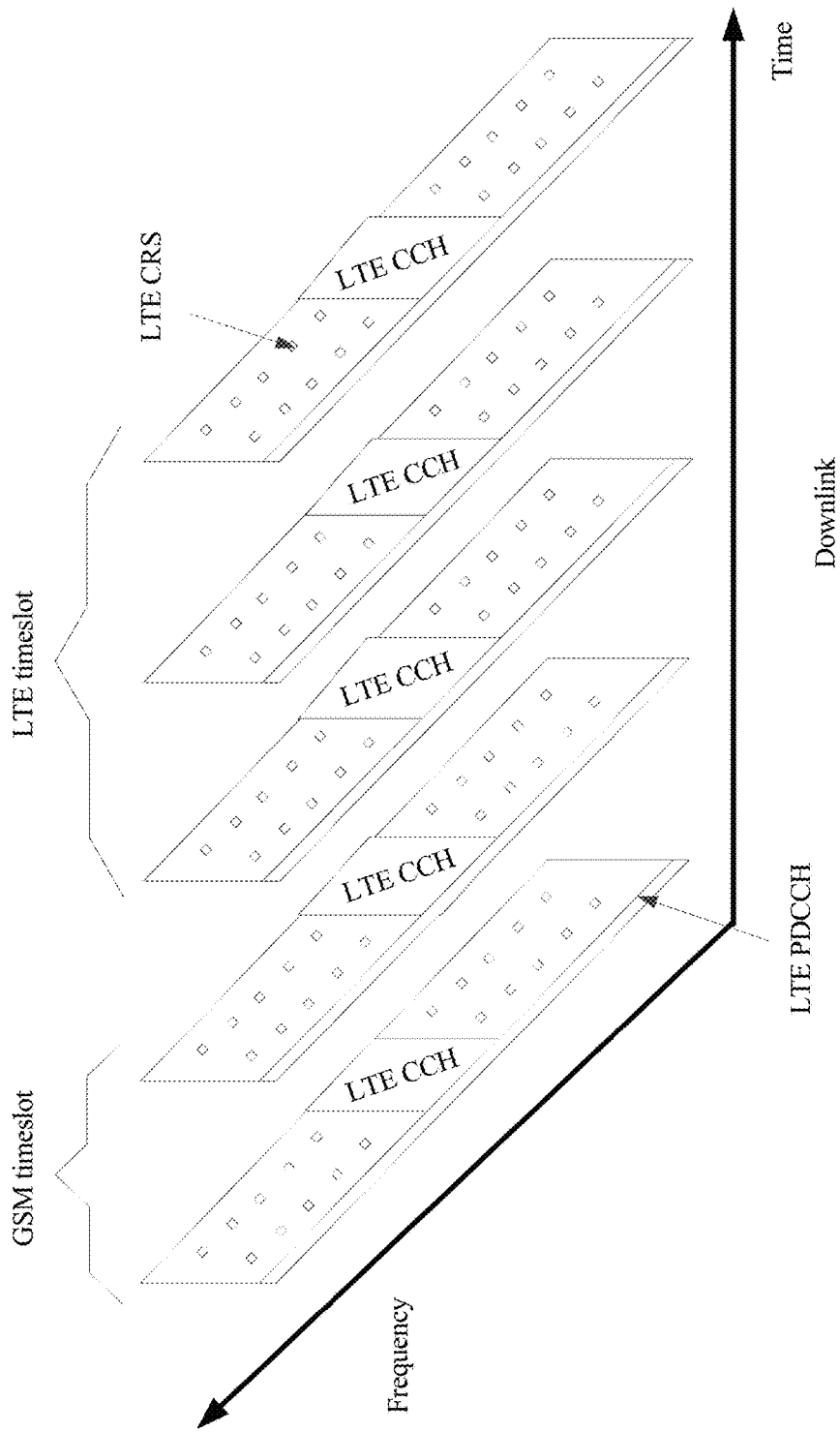
FIG. 8 is a schematic diagram of downlink transmission performed when a second sharing manner of a radio resource sharing method is used according to an embodiment of the present disclosure.
Figure 9:
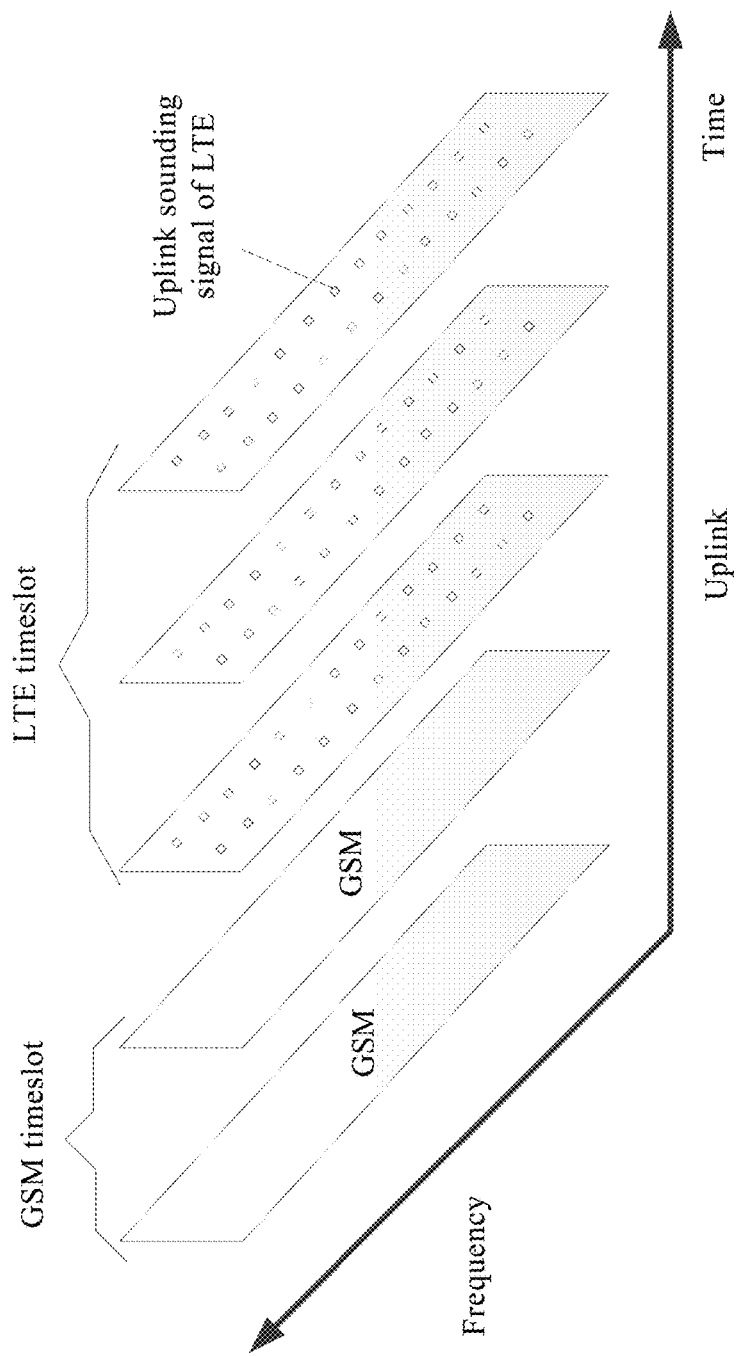
FIG. 9 is a schematic diagram of uplink transmission performed when a second sharing manner of a radio resource sharing method is used according to an embodiment of the present disclosure.

To describe the method more clearly, as shown in FIG. 8 and FIG. 9, an example that the first communications system and the second communications system are respectively an LTE system and a GSM system is used for description.

As shown in FIG. 8, in a downlink transmission timeslot of the GSM,
the third spectrum is used by the GSM system to transmit a PDSCH that is also referred to as a downlink TCH. The second spectrum is used by the LTE system to transmit a CCH. A PDCCH of the LTE system is transmitted on a primary component carrier of the LTE system (not shown in FIG. 7).

Optionally, when load of the GSM system is not high, the entire second spectrum and third spectrum may be used to transmit the PDCCH of the LTE system (in FIG. 6 and FIG. 7, a shadow is used to indicate that the PDCCH is optional). In this case, the second spectrum that is a 1.08 MHz spectrum resource may also be used to transmit a PDSCH of the LTE system. The second spectrum is further used by the LTE system to transmit a downlink feedback for uplink data of a user in an activated state.

Optionally, the third spectrum may be further used to transmit a CRS of the LTE system. Alternatively, a CRS may not be transmitted in a GSM timeslot. Specifically, a load status of the GSM system in the GSM timeslot needs to be considered.

In a downlink transmission timeslot of the LTE,
the entire second spectrum and third spectrum may be used by the LTE system to transmit a PDSCH and a PDCCH that are on a secondary component carrier.

Optionally, the third spectrum is further used to transmit the CRS of the LTE system.

During downlink transmission, to improve spectrum utilization, a transmission timeslot of the LTE and a transmission timeslot of the GSM may be configured to be partially overlapped. When a downlink timeslot of the LTE and a downlink timeslot of the GSM partially overlap, a downlink signal of the GSM is not sent in an overlapped part, so as to prevent the signal of the GSM from interfering with downlink data or control information of the LTE.

As shown in FIG. 9, in an uplink transmission timeslot of the GSM,
the entire fifth spectrum is used by the GSM system to transmit a PUSCH that is also referred to as an uplink TCH. In this case, an uplink feedback that is for downlink data and is of a user in an activated state is transmitted on the primary component carrier of the LTE system (not shown in FIG. 8).

Optionally, the fifth spectrum is further used by the LTE system to transmit an uplink sounding signal. Alternatively, an uplink sounding signal may not be transmitted. Specifically, a load status of the GSM system in a GSM timeslot needs to be considered.

In an uplink transmission timeslot of the LTE,
the entire fifth spectrum may be used by the LTE system to transmit a PUSDH that is on a secondary component carrier.

Optionally, the fifth spectrum is further used by the LTE system to transmit the uplink sounding signal.

It can be learned from the sharing manner that, because there is no need to reserve a partial spectrum for a PUCCH when carrier aggregation is supported, during uplink transmission, all of an uplink shared spectrum may be used by the GSM in a GSM timeslot, or may be scheduled by the LTE for use in an LTE timeslot. Therefore, utilization of a spectrum originally occupied by the PUCCH is improved.

The third sharing manner has a spectrum structure that is basically the same as that in the second sharing manner, and is optimized based on the second sharing manner. Reference may be made to a spectrum structure configuration method in the second sharing manner. Therefore, that the network control device configures the third sharing manner may include the following content.

In the downlink of the first communications system and the downlink of the second communications system, the downlink carrier of the third spectrum and the uplink carrier of the fifth spectrum are used as secondary component carriers for configuring carrier aggregation by the first communications system. Likewise, it may be understood that, the first communications system may configure the downlink carrier of the third spectrum and the uplink carrier of the fifth spectrum as secondary component carriers for carrier aggregation.

In the downlink transmission timeslot of the first communications system, the third spectrum is used by the first communications system to transmit a PDSCH. Scheduling information of the PDSCH is transmitted on a primary component carrier of the first communications system.

In an uplink transmission timeslot of the first communications system, the fifth spectrum is used by the first communications system to transmit a PUSCH. Scheduling information of the PUSCH is transmitted on the primary component carrier of the first communications system. A downlink feedback for uplink data in the first communications system is transmitted on the primary component carrier of the first communications system.

For example, an example that the first communications system and the second communications system are respectively an LTE system and a GSM system is used for description. The third sharing manner may include two spectrum structures. A first spectrum structure may be shown in FIG. 10 and FIG. 11, and is basically the same as the structure in FIG. 6 and FIG. 7. A difference lies in: A dashed line in FIG. 10 indicates that a PDCCH and scheduling information of a PDSCH of the LTE system may be transmitted on a primary component carrier of the LTE system, or may be transmitted on a secondary component carrier of the LTE system (a load status of the GSM system needs to be considered).

Figure 11:
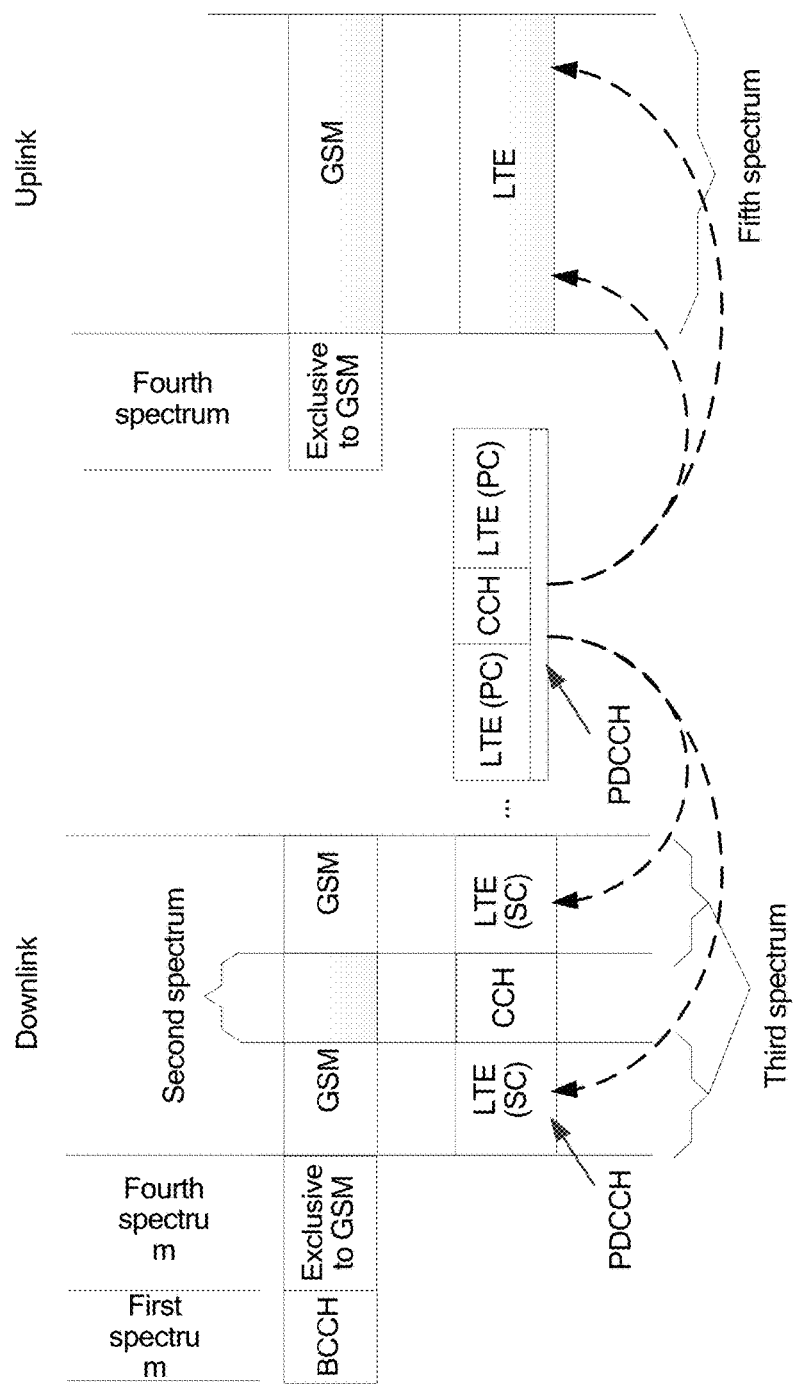
FIG. 11 is a schematic diagram of another spectrum structure in a third sharing manner of a radio resource sharing method according to an embodiment of the present disclosure.

As shown in FIG. 11, during downlink transmission, a fourth spectrum may further exist between the first spectrum and the third spectrum. The fourth spectrum is an exclusive spectrum of the GSM system, and is used to transmit a BCCH, and a PDSCH that is also referred to as a downlink TCH.

Figure 12:
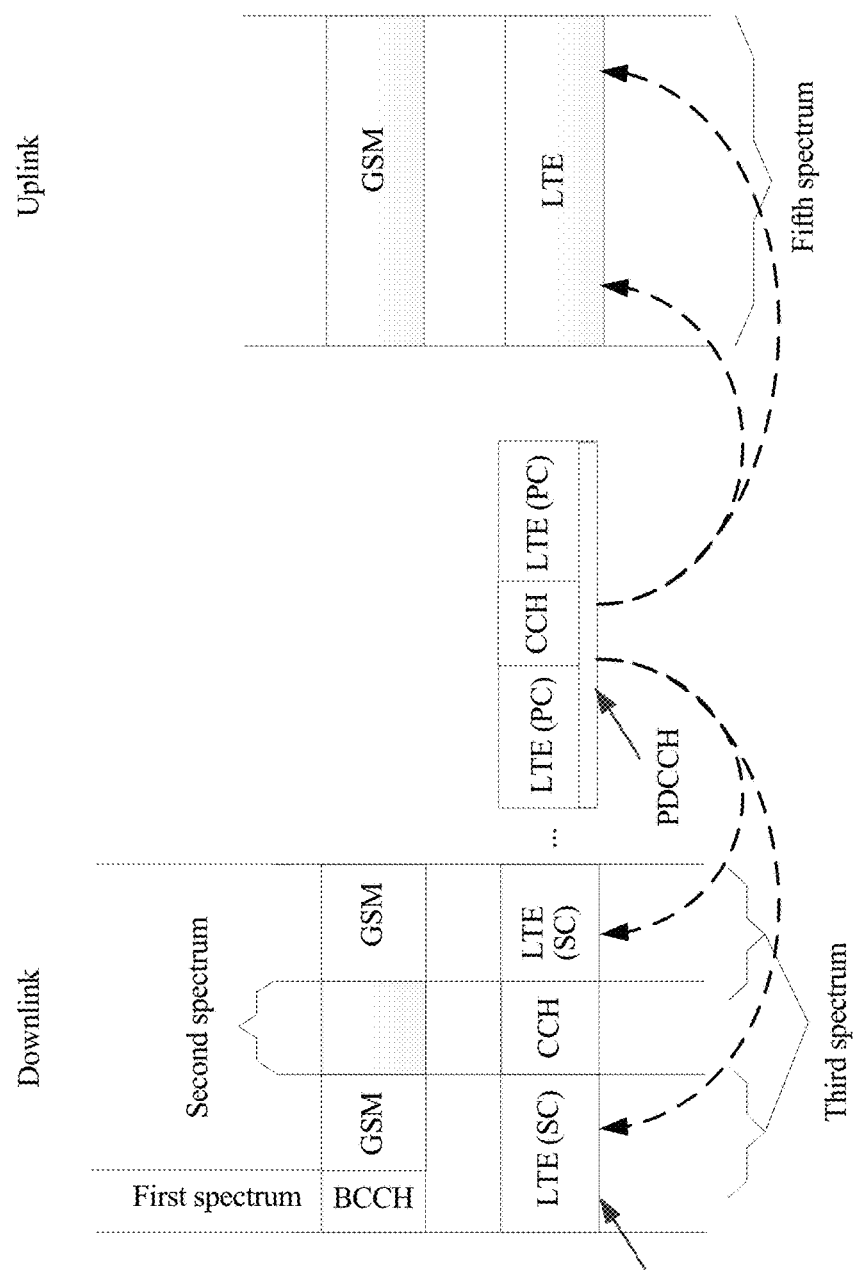
FIG. 12 is a schematic diagram of still another spectrum structure in a third sharing manner of a radio resource sharing method according to an embodiment of the present disclosure.

A second spectrum structure in the third sharing manner may be shown in FIG. 12.

For the first spectrum structure, a method for performing coordination in a time domain is similar to that in the second sharing manner. A difference lies in: When scheduling information, in the LTE system, that is used to schedule a PDSCH spectrum resource cannot be transmitted on a PDCCH on a secondary component carrier of the LTE system, the scheduling information may be transmitted on a PDCCH on a primary component carrier of the LTE. Other parts are the same, and details are not described again. For the second spectrum structure, coordination may be performed in a frequency domain. Specifically, the following content may be included.

Figure 10:
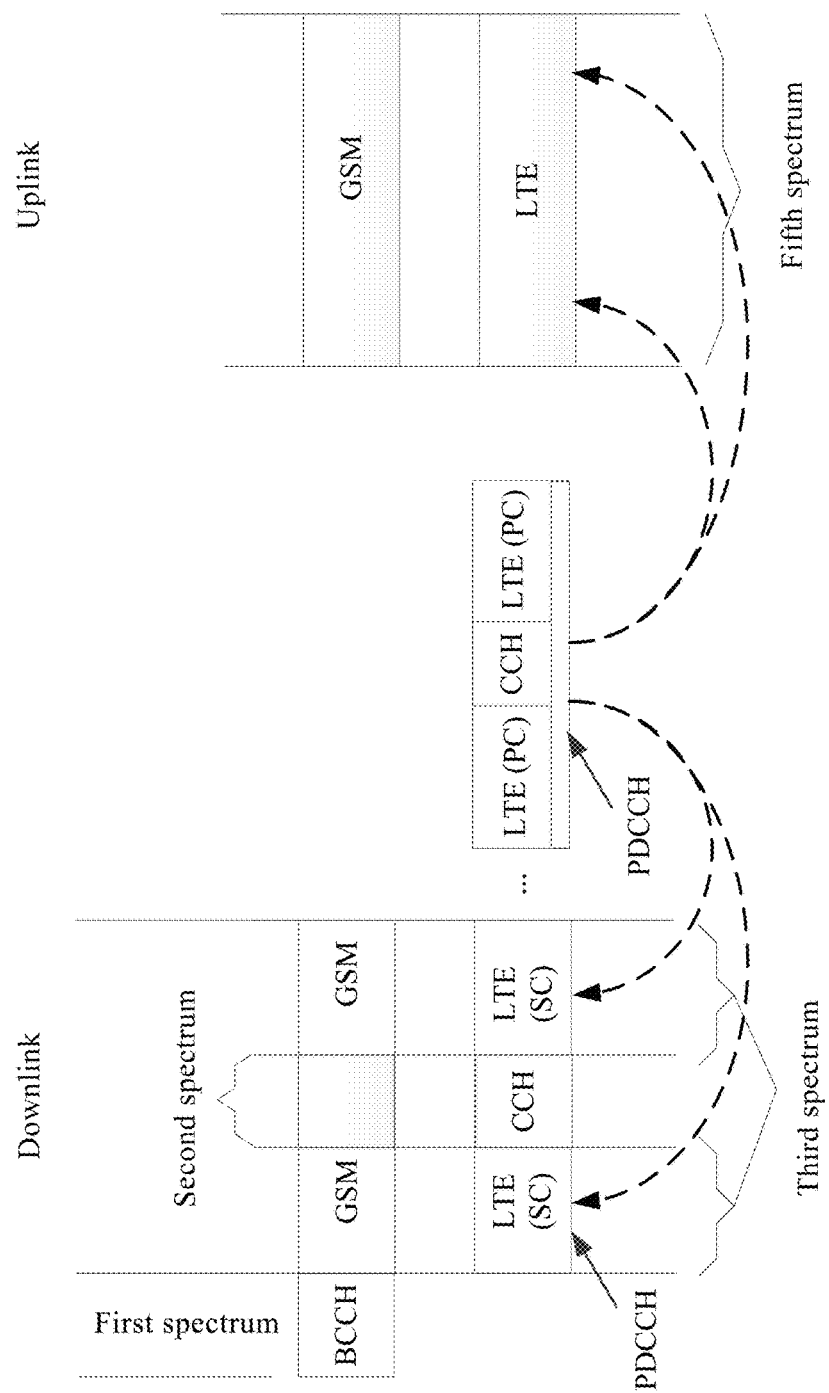
FIG. 10 is a schematic diagram of a spectrum structure in a third sharing manner of a radio resource sharing method according to an embodiment of the present disclosure.
Figure 13:
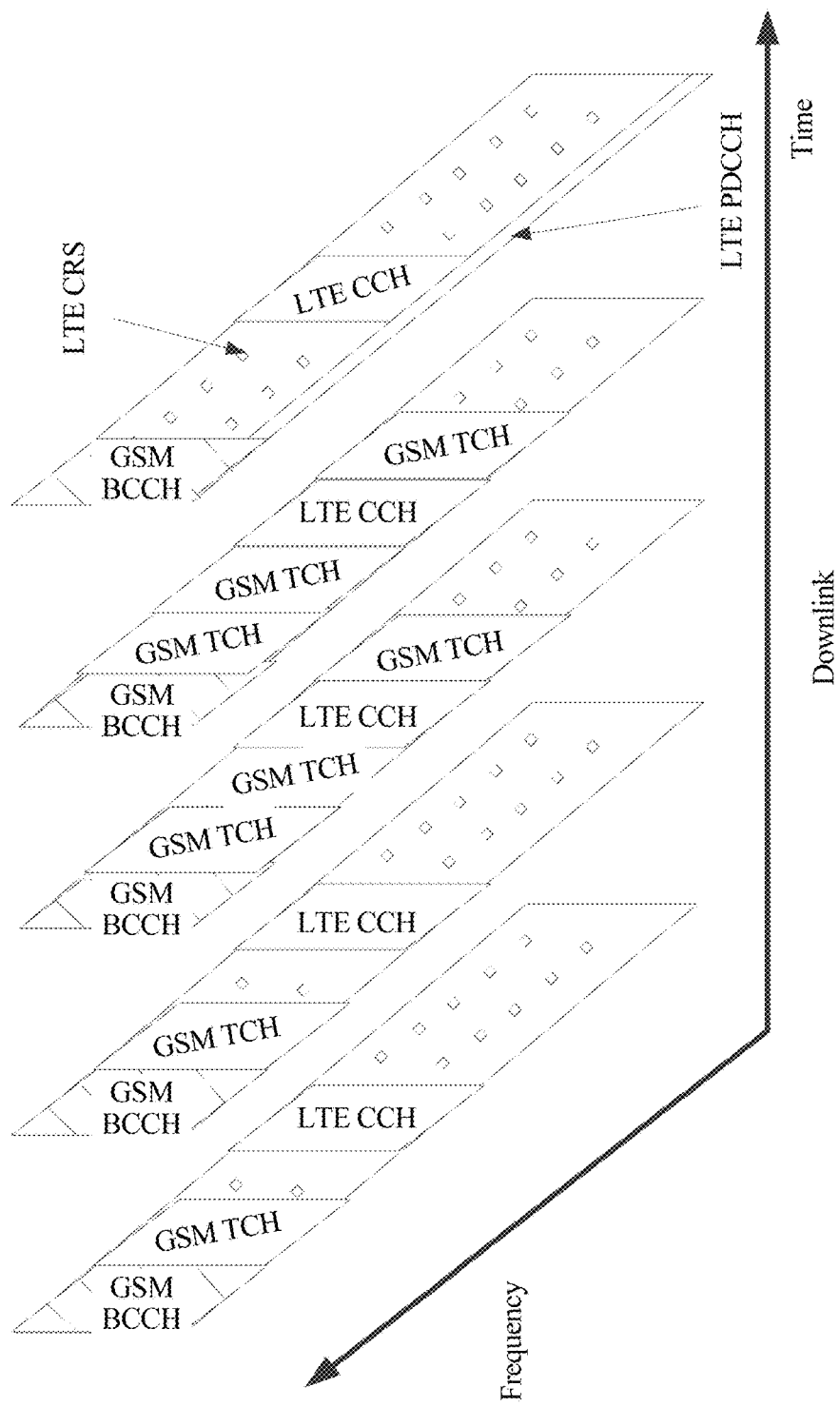
FIG. 13 is a schematic diagram of downlink transmission performed when a third sharing manner of a radio resource sharing method is used according to an embodiment of the present disclosure.

During downlink transmission, as shown in FIG. 13,
the second spectrum is used by the LTE system to transmit a CCH, and the entire third spectrum may be used by the GSM system to transmit a data channel. As shown in FIG. 10 and FIG. 12, a shadow part in the third spectrum is used to transmit a BCCH, and indicates that a BCCH may be transmitted or may not be transmitted. A spectrum that is in the third spectrum and is not occupied by the GSM may be used by the LTE system to transmit a PDSCH. A PDCCH of the LTE system is transmitted on the primary component carrier of the LTE system (not shown in FIG. 12).

As shown by a dashed line in FIG. 12, first scheduling information used to schedule a spectrum resource for the PDSCH from the third spectrum may be transmitted on a PDCCH on the primary component carrier of the LTE system. Alternatively, first scheduling information may be transmitted on a PDCCH on a secondary component carrier of the LTE system. Certainly, a spectrum used to transmit the PDCCH that is on the secondary component carrier of the LTE system is a spectrum that is in the third spectrum and that is not occupied by the GSM system.

Optionally, the third spectrum may be used by the GSM system to transmit a BCCH.

Optionally, a spectrum that is in the third spectrum and is occupied by the GSM system may be further used by the LTE system to transmit a CRS. Alternatively, a CRS may not be transmitted on the spectrum occupied by the GSM system. Specifically, a load status of the GSM system needs to be considered.

During downlink transmission, to improve spectrum utilization, a transmission timeslot of the LTE and a transmission timeslot of the GSM may be configured to be partially overlapped. When a symbol position (which is generally the first to the third symbols in a subframe) occupied by a PDCCH in a downlink timeslot of the LTE and a GSM timeslot overlap, no PDCCH signal may be sent on the one to three symbols in the LTE timeslot. Instead, the PDCCH information is transferred on the primary component carrier in a cross-carrier scheduling manner. In addition, when demodulating PDSCH information in the timeslot, UE does not introduce information on the one to three symbols, so as to ensure that the GSM does not interfere with a PDSCH signal. Alternatively, when a downlink timeslot of the LTE and a downlink timeslot of the GSM partially overlap, a downlink signal of the GSM is not sent in an overlapped part, so as to prevent the signal of the GSM from interfering with downlink data or control information of the LTE.

Figure 14:
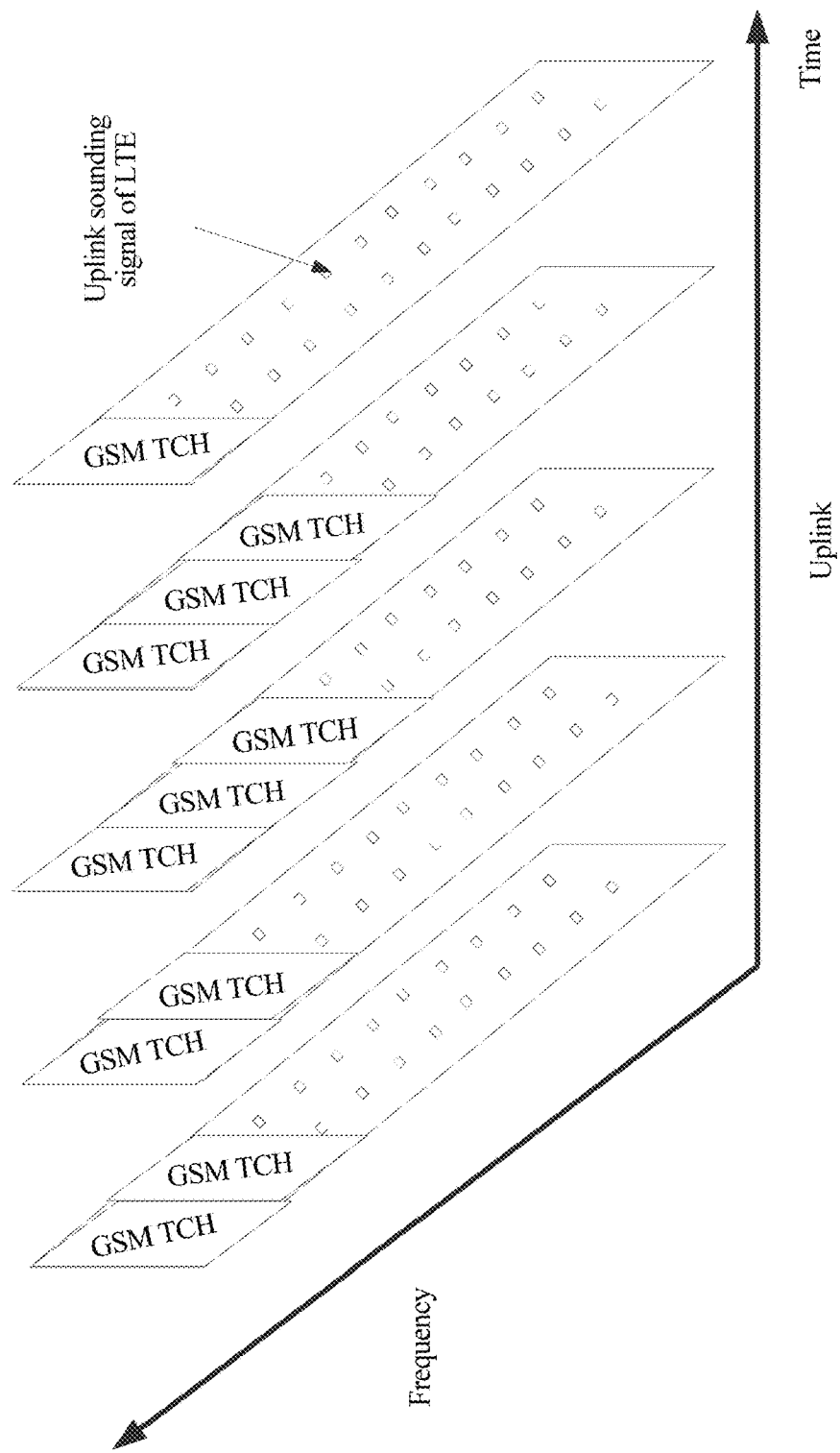
FIG. 14 is a schematic diagram of uplink transmission performed when a third sharing manner of a radio resource sharing method is used according to an embodiment of the present disclosure.

During uplink transmission, as shown in FIG. 14,
the entire fifth spectrum may be used by the GSM system to transmit a physical uplink shared channel. A spectrum that is not occupied by the GSM system may be used by the LTE system to transmit a PDSCH.

As shown by a dashed line in FIG. 12, uplink transmission is similar to downlink transmission. Second scheduling information used to schedule a spectrum resource for a PUSCH from the third spectrum may be transmitted on a PDCCH on the primary component carrier of the LTE system. Alternatively, second scheduling information may be transmitted on a PDCCH on a secondary component carrier of the LTE system. Certainly, a spectrum used to transmit the PDCCH that is on the secondary component carrier of the LTE system is a spectrum that is in the third spectrum and that is not occupied by the GSM system.

Optionally, a spectrum that is in the fifth spectrum and is occupied by the GSM system may be further used by the LTE system to transmit an uplink sounding signal.

During uplink transmission, a spectrum that is in the fifth spectrum and is not occupied by the GSM system may be further used by the LTE system to transmit an uplink sounding signal. Alternatively, an uplink sounding signal may not be transmitted. Specifically, a load status of the GSM system needs to be considered.

In addition, the spectrum division is only an example. A spectrum range occupied by the GSM system and a spectrum range occupied by the LTE system may be dynamically adjusted according to a requirement of each of the two network systems for a traffic volume. An adjustment granularity may be a millisecond range, a second range, a minute range, or the like.

For example, specifically, using which one of the first, the second, and the third sharing manners may be determined according to a carrier quantity of the base station and the following information in the terminal capability distribution information of terminals: the proportion of terminals that support CA, and the proportion of terminals that support cross-carrier scheduling.

For example, the first sharing manner is used when a proportion of terminals in the LTE system that support CA is less than 5%. The second sharing manner may be used when a carrier quantity supported by a base station in the LTE system is 2 and a proportion of terminals that support cross-carrier scheduling is greater than 20%. The third sharing manner may be used when a proportion of terminals in the LTE system that support cross-carrier scheduling is greater than 20%. The proportions are only examples. A selected threshold of the proportion of terminals that support CA, a selected threshold of the proportion of terminals that support cross-carrier scheduling, and a selected threshold of the carrier quantity of the base station may be other values.

S203. The central node sends a spectrum resource allocation message to a base station in the second communications system, where the spectrum resource allocation message includes the determined spectrum sharing manner and information about a spectrum resource allocated to the second communications system.

S204. The base station in the second communications system enables, in the determined spectrum sharing manner, the second communications system to perform spectrum sharing with the first communications system.

Optionally, the method may further include the following steps:

S205. The base station in the second communications system sends a spectrum allocation result to the central node. The spectrum allocation result is used to indicate whether a spectrum is successfully allocated to the first communications system in the determined spectrum sharing manner.

S206. The central node sends the spectrum allocation result to a base station in the first communications system.

S207. The base station in the first communications system performs scheduling constraint processing according to the spectrum allocation result. The scheduling constraint may be understood as enabling the first communications system to perform spectrum sharing with the second communications system.

The scheduling constraint processing includes: determining a range of a new available shared spectrum, and the range includes a frequency-domain range and a time-domain range. Scheduling an LTE resource on the shared spectrum needs to conform to an adjusted new resource constraint. It may be understood that, when a base station in an LTE system allocates a resource to each channel, the resource needs to fall within the range of the shared spectrum obtained by means of division (for example, a frequency of a carrier allocated to the LTE system needs to fall within the range of the shared spectrum), and a time-domain or frequency-domain coordination requirement also needs to be met when the shared spectrum obtained by means of division is used.

Figure 15:
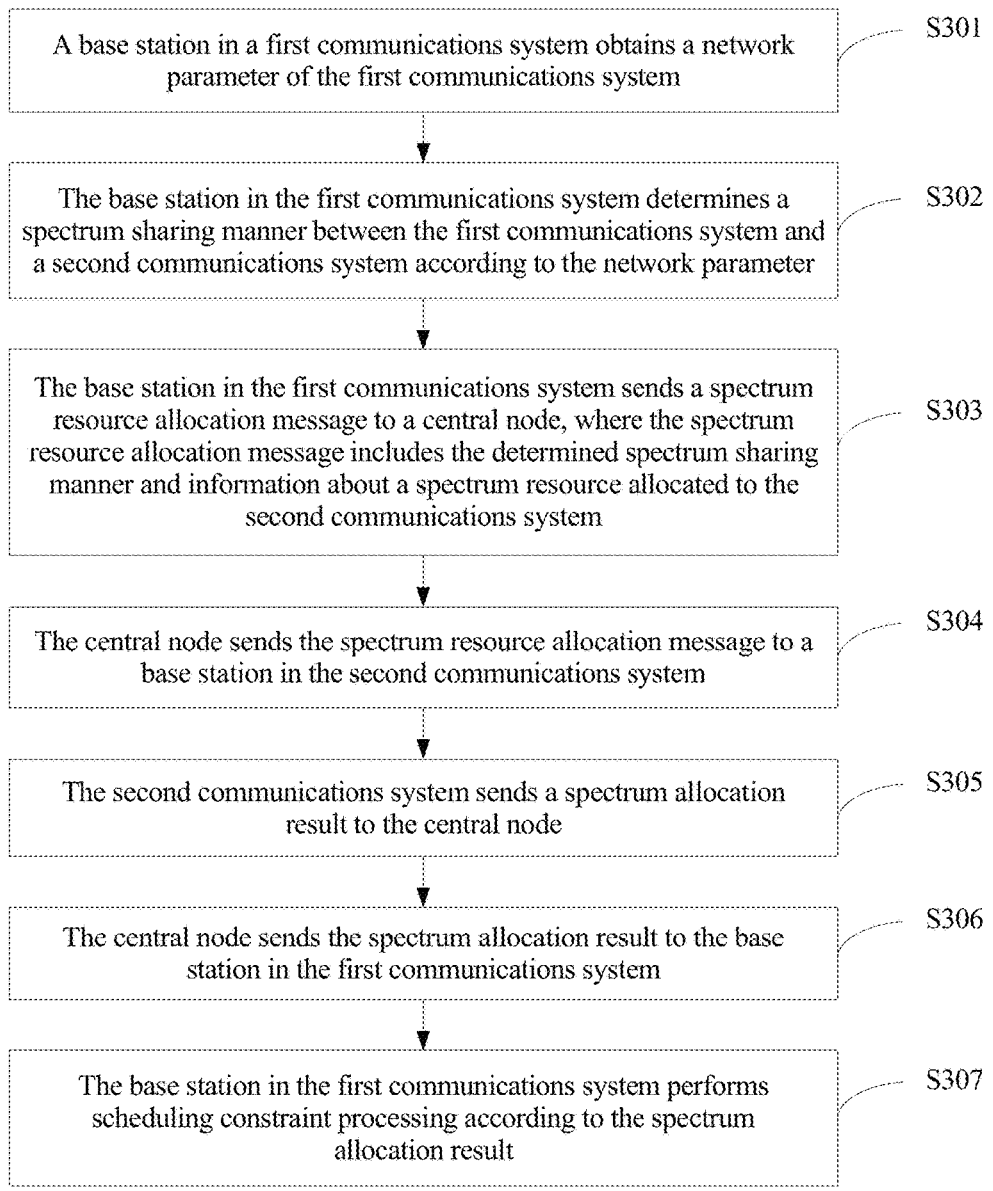
FIG. 15 is still another schematic flowchart of a radio resource sharing method according to an embodiment of the present disclosure.

When a network control device is a base station in a first communications system, as shown in FIG. 15, the method may include the following steps.

S301. The base station in the first communications system obtains a network parameter of the first communications system (a specific obtaining method is the same as that in S201, and details are not described again).

S302. The base station in the first communications system determines a spectrum sharing manner between the first communications system and a second communications system according to the network parameter (a specific determining method is the same as that in S202, and details are not described again).

S303. The base station in the first communications system sends a spectrum resource allocation message to a central node, where the spectrum resource allocation message includes the determined spectrum sharing manner and information about a spectrum resource allocated to the second communications system.

S304. The central node sends the spectrum resource allocation message to a base station in the second communications system.

Optionally, the method may further include the following steps:

S305. The second communications system sends a spectrum allocation result to the central node.

S306. The central node sends the spectrum allocation result to the base station in the first communications system.

S307. The base station in the first communications system performs scheduling constraint processing according to the spectrum allocation result (a specific processing method is the same as that in S207, and details are not described again).

Figure 16:
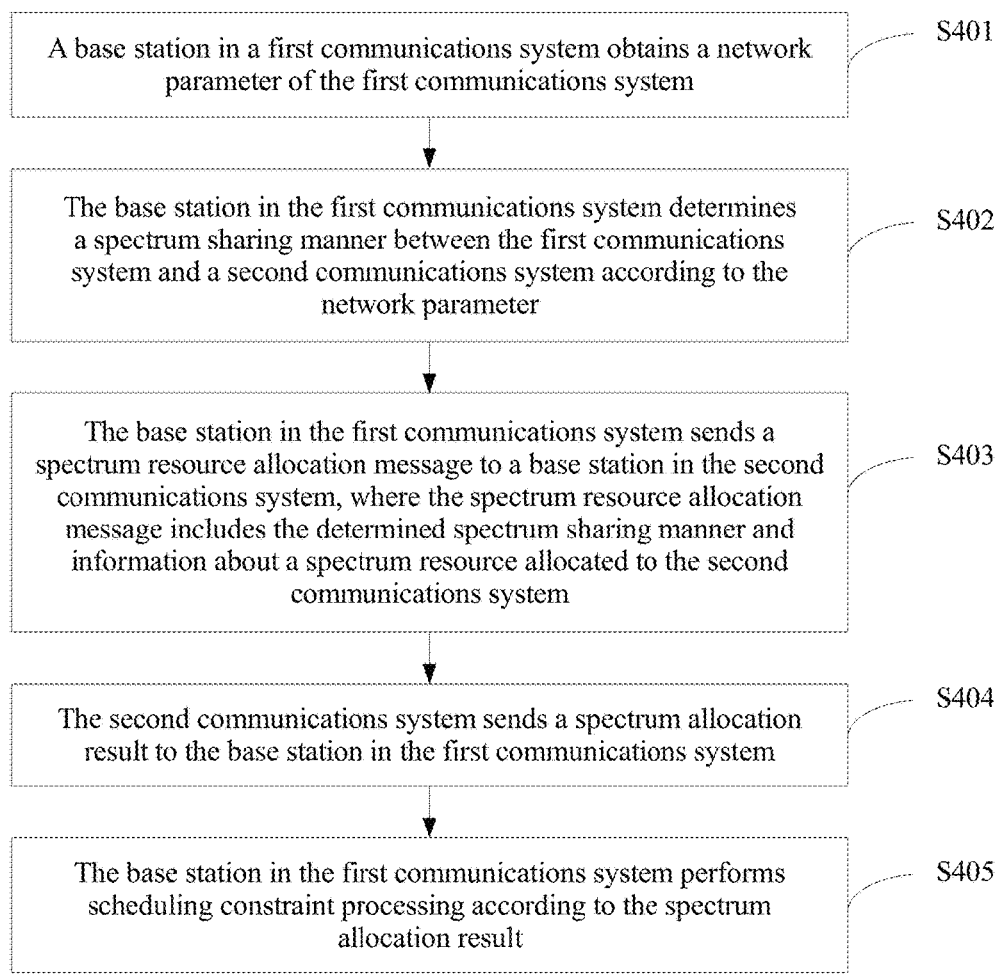
FIG. 16 is still another schematic flowchart of a radio resource sharing method according to an embodiment of the present disclosure.

Alternatively, when a network control device is a base station in a first communications system, as shown in FIG. 16, another method may be used, and the method may include the following steps.

S401. The base station in the first communications system obtains a network parameter of the first communications system (a specific obtaining method is the same as that in S201, and details are not described again).

S402. The base station in the first communications system determines a spectrum sharing manner between the first communications system and a second communications system according to the network parameter (a specific determining method is the same as that in S202, and details are not described again).

S403. The base station in the first communications system sends a spectrum resource allocation message to a base station in the second communications system, where the spectrum resource allocation message includes the determined spectrum sharing manner and information about a spectrum resource allocated to the second communications system.

Optionally, the method may further include the following steps:

S404. The second communications system sends a spectrum allocation result to the base station in the first communications system.

S405. The base station in the first communications system performs scheduling constraint processing according to the spectrum allocation result (a specific processing method is the same as that in S207, and details are not described again).

In conclusion, according to the radio resource sharing method provided in this embodiment of the present disclosure, first, a network control device obtains a network parameter of a first communications system, and configures a spectrum sharing manner between the first communications system and a second communications system according to the network parameter; and next, sends a spectrum resource allocation message to a base station in the second communications system. The spectrum resource allocation message includes the determined spectrum sharing manner and information about a spectrum resource allocated to the second communications system. In this way, inter-system spectrum sharing can be implemented in different network statuses.

Figure 17:
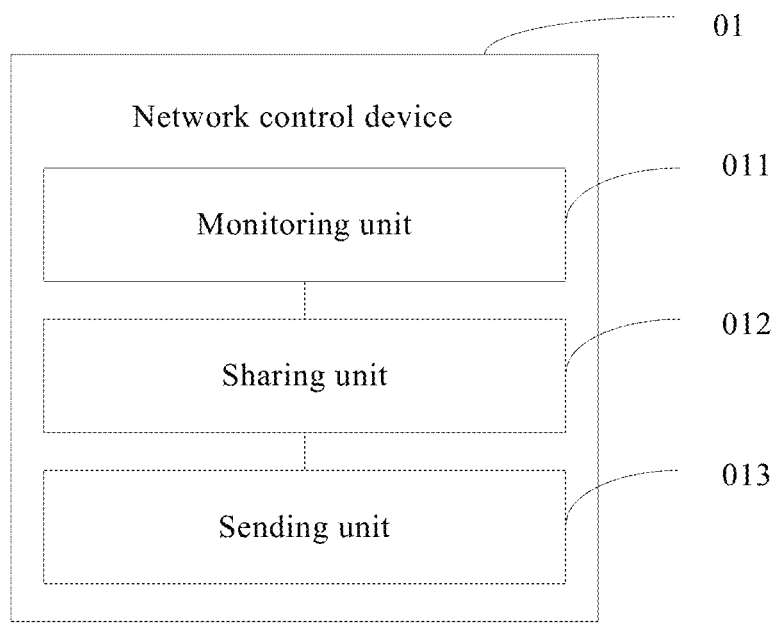
FIG. 17 is a schematic structural diagram of a network control device according to an embodiment of the present disclosure.

An embodiment of the present disclosure provides a network control device 01, located in a communications system including at least a first communications system and a second communications system. As shown in FIG. 17, the network control device 01 includes:
- a monitoring unit 011, configured to obtain a network parameter of the first communications system;
- a sharing unit 012, configured to configure a spectrum sharing manner between the first communications system and the second communications system and a spectrum sharing parameter according to the network parameter; and
- a sending unit 013, configured to send a spectrum resource allocation message to a base station in the second communications system, where the spectrum resource allocation message includes the determined spectrum sharing manner and the spectrum sharing parameter, so that the base station in the second communications system shares a spectrum with the first communications system in the determined spectrum sharing manner.

The network parameter includes at least one type of: distribution information of terminals with different capabilities in the first communications system or carrier quantity information of a base station in the first communications system.

The distribution information of terminals with different capabilities includes: a proportion or quantity of terminals in the first communications system that support carrier aggregation, distribution information of terminals in each cell that support carrier aggregation, a proportion or quantity of terminals that are in all terminals supporting carrier aggregation and that support cross-carrier scheduling, and distribution information of terminals in each cell that support cross-carrier scheduling.

The spectrum sharing manner includes: a first sharing manner that does not support carrier aggregation, a second sharing manner that supports carrier aggregation, and a third sharing manner that supports both carrier aggregation and cross-carrier scheduling.

Figure 18:
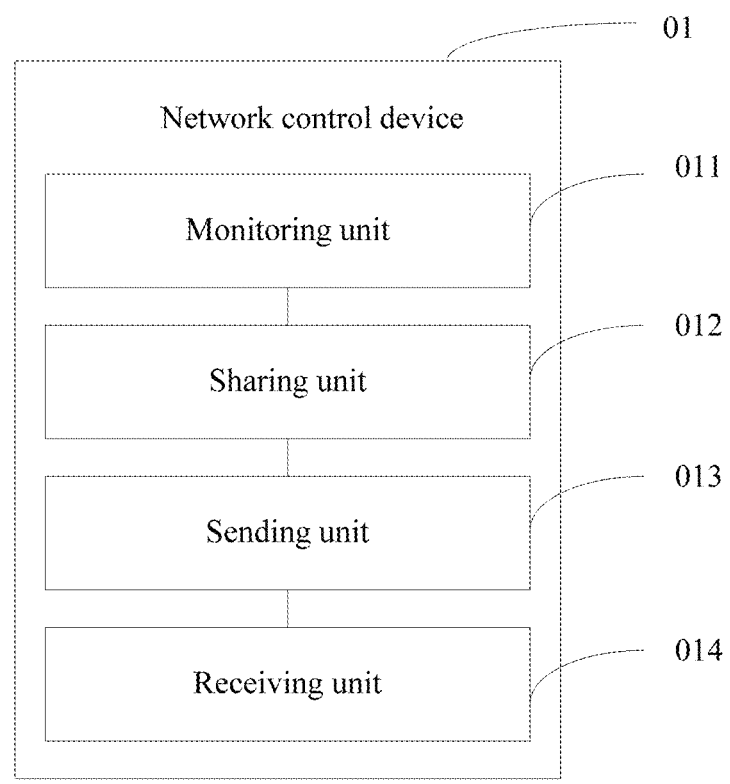
FIG. 18 is another schematic structural diagram of a network control device according to an embodiment of the present disclosure.

Optionally, the network control device 01 is a central node or the base station in the first communications system. When the network control device 01 is the central node, as shown in FIG. 18, the network control device 01 further includes:
- a receiving unit 014, configured to receive a spectrum allocation result from the base station in the second communications system.

The sending unit 013 is further configured to send the spectrum allocation result to the base station in the first communications system, so that the base station in the first communications system enables, according to the spectrum allocation result, the first communications system to perform spectrum sharing with the second communications system.

The central node includes a single resource controller or an operation administration and maintenance device.

Figure 19:
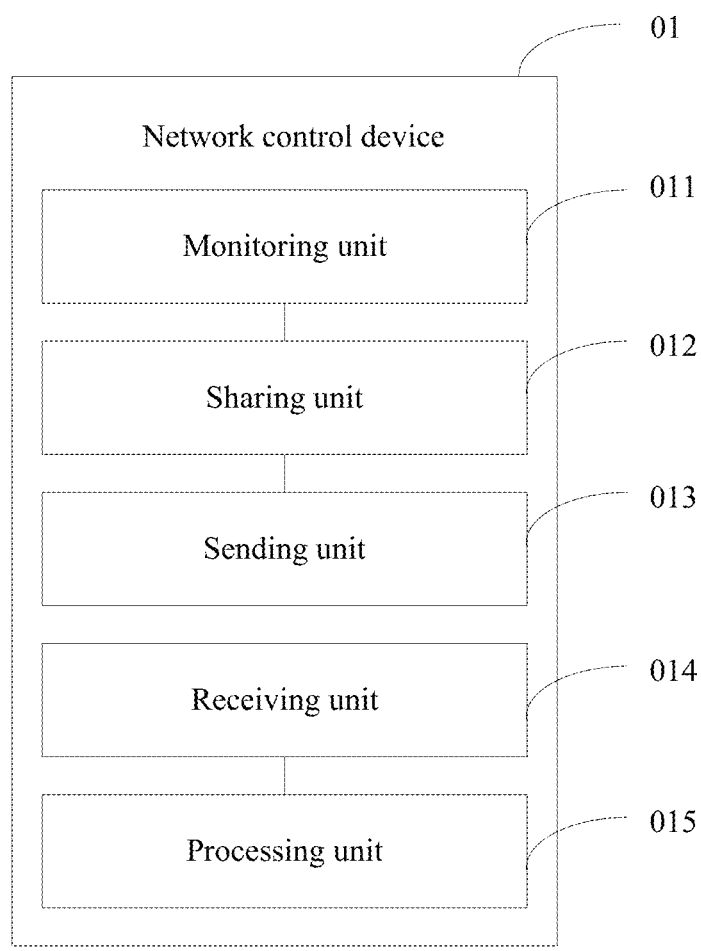
FIG. 19 is still another schematic structural diagram of a network control device according to an embodiment of the present disclosure.

Alternatively, when the network control device 01 is the base station in the first communications system, as shown in FIG. 19, the network control device 01 further includes:
- a receiving unit 014, configured to receive a spectrum allocation result from the base station in the second communications system; and
- a processing unit 015, configured to enable, by the network control device according to the spectrum allocation result, the second communications system to perform spectrum sharing with the first communications system.

Optionally, that the sharing unit 012 is specifically configured to configure the first sharing manner includes:
- in a downlink of the first communications system and a downlink of the second communications system, the network control device configures, for a broadcast control channel of the second communications system, a first spectrum exclusive to the second communications system, and uses the first spectrum as an exclusive spectrum of the broadcast control channel; and
- the network control device configures, as an exclusive spectrum of the first communications system, a second spectrum on which a common channel of the first communications system is located; and configures a third spectrum within downlink system bandwidth of the first communications system as a downlink shared spectrum of the first communications system and the second communications system, where the third spectrum is all or some spectrums, except the second spectrum, within the downlink system bandwidth of the first communications system; and
- in an uplink of the first communications system and an uplink of the second communications system, the network control device configures, as an exclusive spectrum of the first communications system, a fourth spectrum on which an uplink control channel is located and that is within system bandwidth of the first communications system; and configures a fifth spectrum within uplink system bandwidth of the first communications system as an uplink shared spectrum of the first communications system and the second communications system, where the fifth spectrum is all or some spectrums, except the fourth spectrum, within the uplink system bandwidth of the first communications system.

Optionally,
- the first communications system and the second communications system use the third spectrum and the fifth spectrum in a time division manner.

In a downlink transmission timeslot of the second communications system, the third spectrum is used by the second communications system to transmit a physical downlink shared channel. The first spectrum is used by the second communications system to transmit the broadcast control channel. The second spectrum is used by the first communications system to transmit a downlink common channel. The second spectrum is further used to transmit a downlink feedback for uplink data in the first communications system.

In a downlink transmission timeslot of the first communications system, the third spectrum is used by the first communications system to transmit a physical downlink shared channel. The first spectrum is used by the second communications system to transmit the broadcast control channel. The second spectrum is used by the first communications system to transmit the downlink common channel. The second spectrum is used to transmit the downlink feedback for the uplink data in the first communications system.

In an uplink transmission timeslot of the second communications system, the fifth spectrum is used by the second communications system to transmit a physical uplink shared channel. The fourth spectrum is used by the first communications system to transmit a physical uplink control channel.

In an uplink transmission timeslot of the first communications system, the fifth spectrum is used by the first communications system to transmit a physical uplink shared channel. The fourth spectrum is used by the first communications system to transmit the physical uplink control channel.

Optionally,
in the downlink transmission timeslot of the second communications system, the second spectrum is further used to transmit a physical downlink control channel of the first communications system. The second spectrum is further used to transmit the physical downlink shared channel. The third spectrum is further used to transmit a downlink pilot channel. The second spectrum is further used by the first communications system to transmit a downlink feedback for uplink data of user equipment in an activated state.

In the downlink transmission timeslot of the first communications system, the third spectrum is further used by the first communications system to transmit the downlink pilot channel and the physical downlink shared channel. The second spectrum is further used by the first communications system to transmit the downlink feedback for the uplink data of the user equipment in the activated state.

In the uplink transmission timeslot of the second communications system, the fifth spectrum is further used by the first communications system to transmit an uplink sounding signal.

In the uplink transmission timeslot of the first communications system, the fifth spectrum is further used by the first communications system to transmit the uplink sounding signal and the physical uplink shared channel.

Optionally, that the sharing unit 012 is specifically configured to configure the second sharing manner includes:
in a downlink of the first communications system and a downlink of the second communications system, the network control device configures, for a broadcast control channel of the second communications system, a first spectrum exclusive to the second communications system, and uses the first spectrum as an exclusive spectrum of the broadcast control channel; and the network control device configures the first communications system to send a downlink primary synchronization channel and a downlink secondary synchronization channel on a second spectrum on which a synchronization channel of the first communications system is located, where a manner of sending the downlink primary synchronization channel and the downlink secondary synchronization channel includes at least one of the following manners:

the network control device configures the second spectrum as an exclusive spectrum of the first communications system, and configures a third spectrum within downlink system bandwidth of the first communications system as a downlink shared spectrum of the first communications system and the second communications system, where the third spectrum is all or some spectrums, except the second spectrum, within the downlink system bandwidth of the first communications system, and the downlink primary synchronization channel and the downlink secondary synchronization channel of the first communications system are sent on the second spectrum; or the network control device configures the second spectrum as an exclusive spectrum of the first communications system, and configures a third spectrum within downlink system bandwidth of the first communications system as a downlink shared spectrum of the first communications system and the second communications system, where the third spectrum is all or some spectrums, except the second spectrum, within the downlink system bandwidth of the first communications system, and the downlink primary synchronization channel and the downlink secondary synchronization channel of the first communications system are sent on the second spectrum only in a downlink transmission timeslot of the first communications system; or the network control device configures the second spectrum as an exclusive spectrum of the first communications system, and configures a third spectrum within downlink system bandwidth of the first communications system as a downlink shared spectrum of the first communications system and the second communications system, where the third spectrum is all or some spectrums, except the second spectrum, within the downlink system bandwidth of the first communications system, the network control device enables interference, caused by the first communications system to the second spectrum, to be lower than a preset threshold, and the downlink primary synchronization channel and the downlink secondary synchronization channel of the first communications system are sent on the second spectrum; and in an uplink of the first communications system and an uplink of the second communications system, the network control device configures a fifth spectrum within uplink system bandwidth of the first communications system as an uplink shared spectrum of the first communications system and the second communications system, where the fifth spectrum is all or some spectrum configurations within the uplink system bandwidth of the first communications system.

A downlink carrier of the third spectrum and an uplink carrier of the fifth spectrum are used to be configured as secondary component carriers for configuring carrier aggregation by the first communications system.

The first communications system and the second communications system use the third spectrum and the fifth spectrum in a time division manner.

Optionally, in a downlink transmission timeslot of the second communications system, the third spectrum is used by the second communications system to transmit a physical downlink shared channel, or the second spectrum is further used to transmit a downlink feedback for uplink data in the first communications system.

In the downlink transmission timeslot of the first communications system, the third spectrum is used by the first communications system to transmit a physical downlink shared channel. The first spectrum is used by the second communications system to transmit the broadcast control channel. The second spectrum is used to transmit the downlink feedback for the uplink data in the first communications system. The second spectrum and the third spectrum are further used to transmit a physical downlink control channel in the downlink transmission timeslot.

In an uplink transmission timeslot of the second communications system, the fifth spectrum is used by the second communications system to transmit a physical uplink shared channel. An uplink feedback that is for downlink data and is of user equipment in an activated state in the first communications system is transmitted on a primary component carrier of the first communications system.

In an uplink transmission timeslot of the first communications system, the fifth spectrum is used by the first communications system to transmit a physical uplink shared channel. The uplink feedback that is for the downlink data and is of the user equipment in the activated state in the first communications system is transmitted on the primary component carrier of the first communications system. Scheduling information of the physical uplink shared channel is transmitted on the second spectrum and the third spectrum.

Optionally, in the downlink transmission timeslot of the second communications system, the first communications system deactivates a carrier of the third spectrum used by the first communications system. The first communications system does not transmit a downlink pilot channel on the fifth spectrum.

In the downlink transmission timeslot of the first communications system, the first communications system activates the carrier of the third spectrum used by the first communications system. The fifth spectrum is further used by the first communications system to transmit the downlink pilot channel.

In the uplink transmission timeslot of the second communications system, the first communications system deactivates a carrier of the fifth spectrum used by the first communications system. An uplink sounding signal of the first communications system is not transmitted on the fifth spectrum.

In the uplink transmission timeslot of the first communications system, the first communications system activates the carrier of the fifth spectrum used by the first communications system. The fifth spectrum is further used to transmit the uplink sounding signal of the first communications system.

Optionally, in the downlink of the first communications system and the downlink of the second communications system, the network control device configures that a transmission timeslot of the second communications system and a transmission timeslot of the first communications system partially overlap, and controls not to send a signal of the second communications system within a time slice overlapped between the transmission timeslot of the second communications system and the transmission timeslot of the first communications system.

Optionally, that the sharing unit 012 is specifically configured to configure the third sharing manner includes:

in the downlink of the first communications system and the downlink of the second communications system, the downlink carrier of the third spectrum and the uplink carrier of the fifth spectrum are used as secondary component carriers for configuring carrier aggregation by the first communications system;

in the downlink transmission timeslot of the first communications system, the third spectrum is used by the first communications system to transmit a physical downlink shared channel, and scheduling information of the physical downlink shared channel is transmitted on a primary component carrier of the first communications system; and in an uplink transmission timeslot of the first communications system, the fifth spectrum is used by the first communications system to transmit a physical uplink shared channel, scheduling information of the physical uplink shared channel is transmitted on the primary component carrier of the first communications system, and a downlink feedback for uplink data is transmitted on the primary component carrier of the first communications system.

Figure 20:
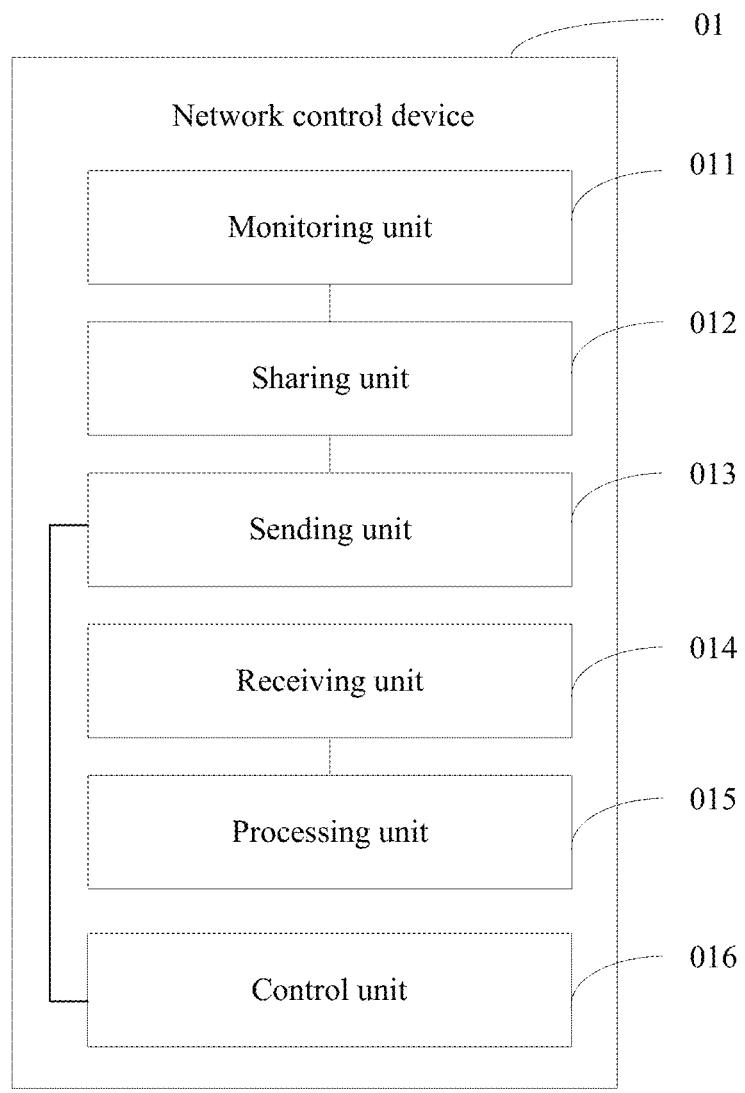
FIG. 20 is still another schematic structural diagram of a network control device according to an embodiment of the present disclosure.

Optionally, as shown in FIG. 20, the network control device 01 further includes: a control unit 016, configured to:

in the downlink of the first communications system and the downlink of the second communications system, configure, by the network control device, that a transmission timeslot of the second communications system and a transmission timeslot of the first communications system partially overlap, and that in the transmission timeslot of the first communications system, a time slice in which a downlink control channel of the first communications system is located and the transmission timeslot of the second communications system overlap, where the downlink control channel of the first communications system is transmitted on the primary component carrier of the first communications system within the time slice.

Optionally, a control unit 016 is configured to:

in the downlink of the first communications system and the downlink of the second communications system, configure, by the network control device, that a transmission timeslot of the second communications system and a transmission timeslot of the first communications system partially overlap, and that in the transmission timeslot of the first communications system, a partial time slice in which the physical downlink shared channel of the first communications system is located and the transmission timeslot of the second communications system overlap; and control the second communications system not to send a signal of the second communications system within a time slice overlapped between the partial time slice and the transmission timeslot of the second communications system.

This embodiment is used to implement the method embodiments. For working procedures and working principles of all units in this embodiment, refer to descriptions in the method embodiments. Details are not described herein again.

According to the network control device provided in this embodiment of the present disclosure, first, the network control device obtains a network parameter of a first communications system, and configures a spectrum sharing manner between the first communications system and a second communications system according to the network parameter; and next, sends a spectrum resource allocation message to a base station in the second communications system. The spectrum resource allocation message includes the determined spectrum sharing manner and information about a spectrum resource allocated to the second communications system. In this way, inter-system spectrum sharing can be implemented in different network statuses.

Figure 21:
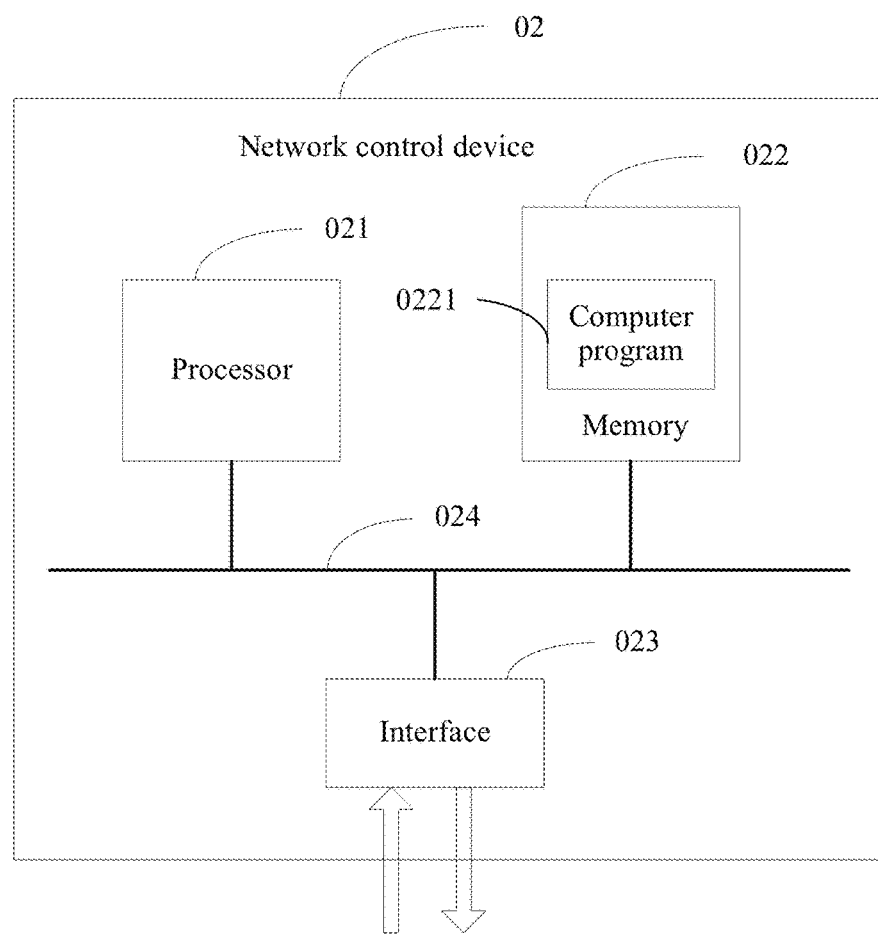
FIG. 21 is a schematic structural diagram of another network control device according to an embodiment of the present disclosure.

An embodiment of the present disclosure further provides another network control device 02, located in a communications system including at least a first communications system and a second communications system. As shown in FIG. 21, the network control device 02 includes: a processor 021, a memory 022, and an interface 023. The processor 021, the memory 022, and the interface 023 are connected by using a bus 024. The interface 023 is configured to interact with another network element in the communications system. The memory 022 is configured to store a computer program 0221. The processor 021 is configured to execute the computer program 0221. The processor 021 executes the computer program 0221 to:
  obtain a network parameter of the first communications system;
  configure a spectrum sharing manner between the first communications system and the second communications system and a spectrum sharing parameter according to the network parameter; and
  send a spectrum resource allocation message to a base station in the second communications system, where the spectrum resource allocation message includes the determined spectrum sharing manner and the spectrum sharing parameter, so that the base station in the second communications system shares a spectrum with the first communications system in the determined spectrum sharing manner.

The network parameter includes at least one type of: distribution information of terminals with different capabilities in the first communications system or carrier quantity information of a base station in the first communications system.

The distribution information of terminals with different capabilities includes: a proportion or quantity of terminals in the first communications system that support carrier aggregation, distribution information of terminals in each cell that support carrier aggregation, a proportion or quantity of terminals that are in all terminals supporting carrier aggregation and that support cross-carrier scheduling, and distribution information of terminals in each cell that support cross-carrier scheduling.

The spectrum sharing manner includes: a first sharing manner that does not support carrier aggregation, a second sharing manner that supports carrier aggregation, and a third sharing manner that supports both carrier aggregation and cross-carrier scheduling.

Optionally, the network control device is a central node configured to control the base station in the first communications system and the base station in the second communications system to perform resource coordination, or the base station in the first communications system. When the network control device is the central node, the processor 021 executes the computer program 0221 to specifically:
  receive a spectrum allocation result from the base station in the second communications system; and
  send the spectrum allocation result to the base station in the first communications system, so that the base station in the first communications system enables, according to the spectrum allocation result, the first communications system to perform spectrum sharing with the second communications system.

The central node includes a single resource controller or an operation administration and maintenance device.

Alternatively, when the network control device is the base station in the first communications system, the processor executes the computer program to specifically:
  receive a spectrum allocation result from the base station in the second communications system; and
  enable, by the network control device according to the spectrum allocation result, the second communications system to perform spectrum sharing with the first communications system.

Optionally, that the processor 021 executes the computer program 0221 to configure the first sharing manner includes:
  in a downlink of the first communications system and a downlink of the second communications system, the network control device configures, for a broadcast control channel of the second communications system, a first spectrum exclusive to the second communications system, and uses the first spectrum as an exclusive spectrum of the broadcast control channel; and
  the network control device configures, as an exclusive spectrum of the first communications system, a second spectrum on which a common channel of the first communications system is located; and configures a third spectrum within downlink system bandwidth of the first communications system as a downlink shared spectrum of the first communications system and the second communications system, where the third spectrum is all or some spectrums, except the second spectrum, within the downlink system bandwidth of the first communications system; and
  in an uplink of the first communications system and an uplink of the second communications system, the network control device configures, as an exclusive spectrum of the first communications system, a fourth spectrum on which an uplink control channel is located and that is within system bandwidth of the first communications system; and configures a fifth spectrum within uplink system bandwidth of the first communications system as an uplink shared spectrum of the first communications system and the second communications system, where the fifth spectrum is all or some spectrums, except the fourth spectrum, within the uplink system bandwidth of the first communications system.

Optionally,
  the first communications system and the second communications system use the third spectrum and the fifth spectrum in a time division manner.

In a downlink transmission timeslot of the second communications system, the third spectrum is used by the second communications system to transmit a physical downlink shared channel. The first spectrum is used by the second communications system to transmit the broadcast control channel. The second spectrum is used by the first communications system to transmit a downlink common channel. The second spectrum is further used to transmit a downlink feedback for uplink data in the first communications system.

In a downlink transmission timeslot of the first communications system, the third spectrum is used by the first communications system to transmit a physical downlink shared channel. The first spectrum is used by the second communications system to transmit the broadcast control channel. The second spectrum is used by the first communications system to transmit the downlink common channel. The second spectrum is used to transmit the downlink feedback for the uplink data in the first communications system.

In an uplink transmission timeslot of the second communications system, the fifth spectrum is used by the second communications system to transmit a physical uplink shared channel. The fourth spectrum is used by the first communications system to transmit a physical uplink control channel.

In an uplink transmission timeslot of the first communications system, the fifth spectrum is used by the first communications system to transmit a physical uplink shared channel. The fourth spectrum is used by the first communications system to transmit the physical uplink control channel.

Optionally, in the downlink transmission timeslot of the second communications system, the second spectrum is further used to transmit a physical downlink control channel of the first communications system. The second spectrum is further used to transmit the physical downlink shared channel. The third spectrum is further used to transmit a downlink pilot channel. The second spectrum is further used by the first communications system to transmit a downlink feedback for uplink data of user equipment in an activated state.

In the downlink transmission timeslot of the first communications system, the third spectrum is further used by the first communications system to transmit the downlink pilot channel and the physical downlink shared channel. The second spectrum is further used by the first communications system to transmit the downlink feedback for the uplink data of the user equipment in the activated state.

In the uplink transmission timeslot of the second communications system, the fifth spectrum is further used by the first communications system to transmit an uplink sounding signal.

In the uplink transmission timeslot of the first communications system, the fifth spectrum is further used by the first communications system to transmit the uplink sounding signal and the physical uplink shared channel.

Optionally, that the processor 021 executes the computer program 0221 to configure the second sharing manner includes:

in a downlink of the first communications system and a downlink of the second communications system, the network control device configures, for a broadcast control channel of the second communications system, a first spectrum exclusive to the second communications system, and uses the first spectrum as an exclusive spectrum of the broadcast control channel; and the network control device configures the first communications system to send a downlink primary synchronization channel and a downlink secondary synchronization channel on a second spectrum on which a synchronization channel of the first communications system is located, where a manner of sending the downlink primary synchronization channel and the downlink secondary synchronization channel includes at least one of the following manners:

the network control device configures the second spectrum as an exclusive spectrum of the first communications system, and configures a third spectrum within downlink system bandwidth of the first communications system as a downlink shared spectrum of the first communications system and the second communications system, where the third spectrum is all or some spectrums, except the second spectrum, within the downlink system bandwidth of the first communications system, and the downlink primary synchronization channel and the downlink secondary synchronization channel of the first communications system are sent on the second spectrum; or the network control device configures the second spectrum as an exclusive spectrum of the first communications system, and configures a third spectrum within downlink system bandwidth of the first communications system as a downlink shared spectrum of the first communications system and the second communications system, where the third spectrum is all or some spectrums, except the second spectrum, within the downlink system bandwidth of the first communications system, and the downlink primary synchronization channel and the downlink secondary synchronization channel of the first communications system are sent on the second spectrum only in a downlink transmission timeslot of the first communications system; or the network control device configures the second spectrum as an exclusive spectrum of the first communications system, and configures a third spectrum within downlink system bandwidth of the first communications system as a downlink shared spectrum of the first communications system and the second communications system, where the third spectrum is all or some spectrums, except the second spectrum, within the downlink system bandwidth of the first communications system, the network control device enables interference, caused by the first communications system to the second spectrum, to be lower than a preset threshold, and the downlink primary synchronization channel and the downlink secondary synchronization channel of the first communications system are sent on the second spectrum; and in an uplink of the first communications system and an uplink of the second communications system, the network control device configures a fifth spectrum within uplink system bandwidth of the first communications system as an uplink shared spectrum of the first communications system and the second communications system, where the fifth spectrum is all or some spectrum configurations within the uplink system bandwidth of the first communications system.

A downlink carrier of the third spectrum and an uplink carrier of the fifth spectrum are used to be configured as secondary component carriers for configuring carrier aggregation by the first communications system.

The first communications system and the second communications system use the third spectrum and the fifth spectrum in a time division manner.

Optionally, in a downlink transmission timeslot of the second communications system, the third spectrum is used by the second communications system to transmit a physical downlink shared channel, or the second spectrum is further used to transmit a downlink feedback for uplink data in the first communications system.

In the downlink transmission timeslot of the first communications system, the third spectrum is used by the first communications system to transmit a physical downlink shared channel. The first spectrum is used by the second communications system to transmit the broadcast control channel. The second spectrum is used to transmit the downlink feedback for the uplink data in the first communications system. The second spectrum and the third spectrum are further used to transmit a physical downlink control channel in the downlink transmission timeslot.

In an uplink transmission timeslot of the second communications system, the fifth spectrum is used by the second communications system to transmit a physical uplink shared channel. An uplink feedback that is for downlink data and is of user equipment in an activated state in the first communications system is transmitted on a primary component carrier of the first communications system.

In an uplink transmission timeslot of the first communications system, the fifth spectrum is used by the first communications system to transmit a physical uplink shared channel. The uplink feedback that is for the downlink data and is of the user equipment in the activated state in the first communications system is transmitted on the primary component carrier of the first communications system. Scheduling information of the physical uplink shared channel is transmitted on the second spectrum and the third spectrum.

Optionally,
in the downlink transmission timeslot of the second communications system, the first communications system deactivates a carrier of the third spectrum used by the first communications system. The first communications system does not transmit a downlink pilot channel on the fifth spectrum.

In the downlink transmission timeslot of the first communications system, the first communications system activates the carrier of the third spectrum used by the first communications system. The fifth spectrum is further used by the first communications system to transmit the downlink pilot channel.

In the uplink transmission timeslot of the second communications system, the first communications system deactivates a carrier of the fifth spectrum used by the first communications system. An uplink sounding signal of the first communications system is not transmitted on the fifth spectrum.

In the uplink transmission timeslot of the first communications system, the first communications system activates the carrier of the fifth spectrum used by the first communications system. The fifth spectrum is further used to transmit the uplink sounding signal of the first communications system.

Optionally,
in the downlink of the first communications system and the downlink of the second communications system, the network control device configures that a transmission timeslot of the second communications system and a transmission timeslot of the first communications system partially overlap, and controls not to send a signal of the second communications system within a time slice overlapped between the transmission timeslot of the second communications system and the transmission timeslot of the first communications system.

Optionally, that the processor 021 executes the computer program 0221 to configure the third sharing manner includes:

in the downlink of the first communications system and the downlink of the second communications system, the downlink carrier of the third spectrum and the uplink carrier of the fifth spectrum are used as secondary component carriers for configuring carrier aggregation by the first communications system;

in the downlink transmission timeslot of the first communications system, the third spectrum is used by the first communications system to transmit a physical downlink shared channel, and scheduling information of the physical downlink shared channel is transmitted on a primary component carrier of the first communications system; and in an uplink transmission timeslot of the first communications system, the fifth spectrum is used by the first communications system to transmit a physical uplink shared channel, scheduling information of the physical uplink shared channel is transmitted on the primary component carrier of the first communications system, and a downlink feedback for uplink data is transmitted on the primary component carrier of the first communications system.

Optionally, the processor 021 executes the computer program 0221 to further:

in the downlink of the first communications system and the downlink of the second communications system, configure, by the network control device, that a transmission timeslot of the second communications system and a transmission timeslot of the first communications system partially overlap, and that in the transmission timeslot of the first communications system, a time slice in which a downlink control channel of the first communications system is located and the transmission timeslot of the second communications system overlap, where the downlink control channel of the first communications system is transmitted on the primary component carrier of the first communications system within the time slice.

Optionally, the processor 021 executes the computer program 0221 to further:

in the downlink of the first communications system and the downlink of the second communications system, configure, by the network control device, that a transmission timeslot of the second communications system and a transmission timeslot of the first communications system partially overlap, and that in the transmission timeslot of the first communications system, a partial time slice in which the physical downlink shared channel of the first communications system is located and the transmission timeslot of the second communications system overlap; and control the second communications system not to send a signal of the second communications system within a time slice overlapped between the partial time slice and the transmission timeslot of the second communications system.

This embodiment is used to implement the method embodiments. For working procedures and working principles of all units in this embodiment, refer to descriptions in the method embodiments. Details are not described herein again.

According to the network control device provided in this embodiment of the present disclosure, first, the network control device obtains a network parameter of a first communications system, and configures a spectrum sharing manner between the first communications system and a second communications system according to the network parameter; and next, sends a spectrum resource allocation message to a base station in the second communications system. The spectrum resource allocation message includes the determined spectrum sharing manner and information about a spectrum resource allocated to the second communications system. In this way, inter-system spectrum sharing can be implemented in different network statuses.

In the several embodiments provided in the present disclosure, it should be understood that, the disclosed apparatus and method may be implemented in other manners. For example, the described apparatus embodiment is only an example. For example, the unit division is only logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. Indirect couplings or communication connections between the apparatuses or units may be implemented in electronic, mechanical, or another form.

The units described as separate components may or may not be physically separate, and components displayed as units may or may not be physical units, may be located in one position, or may be distributed on multiple network units. Some or all of the units may be selected according to actual requirements, to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) or a processor to perform some of the steps of the methods described in the embodiments of the present disclosure. The storage medium includes: any medium that can store program code, such as a USB flash drive, a removable hard disk, a read-only memory (ROM), a random access memory (RAM), a magnetic disk, or an optical disc.

Finally, it should be noted that, the embodiments are only intended for describing the technical solutions of the present disclosure, but not for limiting the present disclosure. Although the present disclosure is described in detail with reference to the embodiments, persons of ordinary skill in the art should understand that they may still make modifications to the technical solutions described in the embodiments or make equivalent replacements to some or all technical features thereof, without departing from the scope of the technical solutions of the embodiments of the present disclosure.

What is claimed is:

1. A radio resource sharing method, wherein the method comprises:
   obtaining, by a network control device, a network parameter of a first communications system;
   configuring, by the network control device, a spectrum sharing manner between the first communications system and a second communications system according to the network parameter; and
   sending, by the network control device, a spectrum resource allocation message to a base station in the second communications system, wherein the spectrum resource allocation message comprises the determined spectrum sharing manner and information about a spectrum resource allocated to the second communications system; wherein
   the network parameter comprises at least one type of: distribution information of terminals with different capabilities in the first communications system or carrier quantity information of a base station in the first communications system;
   the distribution information of terminals with different capabilities comprises: a proportion or quantity of terminals in the first communications system that support carrier aggregation, distribution information of terminals in each cell that support carrier aggregation, a proportion or quantity of terminals that are in all terminals supporting carrier aggregation and that support cross-carrier scheduling, and distribution information of terminals in each cell that support cross-carrier scheduling; and
   the spectrum sharing manner comprises: a first sharing manner that does not support carrier aggregation, a second sharing manner that supports carrier aggregation, and a third sharing manner that supports both carrier aggregation and cross-carrier scheduling.

2. The method according to claim 1, wherein the network control device is a central node; and
   the method further comprises:
   receiving, by the network control device, a spectrum allocation result from the base station in the second communications system; and
   sending, by the network control device, the spectrum allocation result to the base station in the first communications system, so that the base station in the first communications system enables, according to the spectrum allocation result, the first communications system and the second communications system to perform spectrum sharing, wherein
   the central node comprises a single resource controller or an operation administration and maintenance device.

3. The method according to claim 1, wherein the network control device is the base station in the first communications system, the method further comprises:
   receiving, by the network control device, a spectrum allocation result from the base station in the second communications system; and
   enabling, by the network control device according to the spectrum allocation result, the second communications system to perform spectrum sharing with the first communications system.

4. The method according to claim 2, wherein configuring, by the network control device, the first sharing manner comprises:
   in a downlink of the first communications system and a downlink of the second communications system, configuring, by the network control device for a broadcast control channel of the second communications system, a first spectrum exclusive to the second communications system, and using the first spectrum as an exclusive spectrum of the broadcast control channel; and
   configuring, by the network control device as an exclusive spectrum of the first communications system, a second spectrum on which a common channel of the first communications system is located; and configuring a third spectrum within downlink system bandwidth of the first communications system as a downlink shared spectrum of the first communications system and the second communications system, wherein the third spectrum is all or some spectrums, except the second spectrum, within the downlink system bandwidth of the first communications system.

5. The method according to claim 2, wherein
in an uplink of the first communications system and an uplink of the second communications system, configuring, by the network control device as an exclusive spectrum of the first communications system, a fourth spectrum on which an uplink control channel is located and that is within system bandwidth of the first communications system; and configuring a fifth spectrum within uplink system bandwidth of the first communications system as an uplink shared spectrum of the first communications system and the second communications system, wherein the fifth spectrum is all or some spectrums, except the fourth spectrum, within the uplink system bandwidth of the first communications system.

6. The method according to claim 4, wherein
the first communications system and the second communications system use the third spectrum and the fifth spectrum in a time division manner;
in a downlink transmission timeslot of the second communications system, the third spectrum is used by the second communications system to transmit a physical downlink shared channel, the first spectrum is used by the second communications system to transmit the broadcast control channel, the second spectrum is used by the first communications system to transmit a downlink common channel, and the second spectrum is further used to transmit a downlink feedback for uplink data in the first communications system;
in a downlink transmission timeslot of the first communications system, the third spectrum is used by the first communications system to transmit a physical downlink shared channel, the first spectrum is used by the second communications system to transmit the broadcast control channel, the second spectrum is used by the first communications system to transmit the downlink common channel, and the second spectrum is used to transmit the downlink feedback for the uplink data in the first communications system;
in an uplink transmission timeslot of the second communications system, the fifth spectrum is used by the second communications system to transmit a physical uplink shared channel, and the fourth spectrum is used by the first communications system to transmit a physical uplink control channel; and
in an uplink transmission timeslot of the first communications system, the fifth spectrum is used by the first communications system to transmit a physical uplink shared channel, and the fourth spectrum is used by the first communications system to transmit the physical uplink control channel.

7. The method according to claim 2, wherein configuring, by the network control device, the second sharing manner comprises:
in a downlink of the first communications system and a downlink of the second communications system, configuring, by the network control device for a broadcast control channel of the second communications system, a first spectrum exclusive to the second communications system, and using the first spectrum as an exclusive spectrum of the broadcast control channel; and configuring, by the network control device, the first communications system to send a downlink primary synchronization channel and a downlink secondary synchronization channel on a second spectrum on which a synchronization channel of the first communications system is located, wherein a manner of sending the downlink primary synchronization channel and the downlink secondary synchronization channel comprises at least one of the following manners:
the network control device configures the second spectrum as an exclusive spectrum of the first communications system, and configures a third spectrum within downlink system bandwidth of the first communications system as a downlink shared spectrum of the first communications system and the second communications system, wherein the third spectrum is all or some spectrums, except the second spectrum, within the downlink system bandwidth of the first communications system, and the downlink primary synchronization channel and the downlink secondary synchronization channel of the first communications system are sent on the second spectrum; or
the network control device configures the second spectrum as an exclusive spectrum of the first communications system, and configures a third spectrum within downlink system bandwidth of the first communications system as a downlink shared spectrum of the first communications system and the second communications system, wherein the third spectrum is all or some spectrums, except the second spectrum, within the downlink system bandwidth of the first communications system, and the downlink primary synchronization channel and the downlink secondary synchronization channel of the first communications system are sent on the second spectrum only in a downlink transmission timeslot of the first communications system; or
the network control device configures the second spectrum as an exclusive spectrum of the first communications system, and configures a third spectrum within downlink system bandwidth of the first communications system as a downlink shared spectrum of the first communications system and the second communications system, wherein the third spectrum is all or some spectrums, except the second spectrum, within the downlink system bandwidth of the first communications system, the network control device enables interference, caused by the first communications system to the second spectrum, to be lower than a preset threshold, and the downlink primary synchronization channel and the downlink secondary synchronization channel of the first communications system are sent on the second spectrum; and
in an uplink of the first communications system and an uplink of the second communications system, configuring, by the network control device, a fifth spectrum within uplink system bandwidth of the first communications system as an uplink shared spectrum of the first communications system and the second communications system, wherein the fifth spectrum is all or some spectrum configurations within the uplink system bandwidth of the first communications system, wherein
a downlink carrier of the third spectrum and an uplink carrier of the fifth spectrum are used to be configured as secondary component carriers for configuring carrier aggregation by the first communications system; and the first communications system and the second communications system use the third spectrum and the fifth spectrum in a time division manner.

8. A network control device, wherein the network control device is located in a communications system comprising at least a first communications system and a second communications system, and the network control device comprises:
a processor, configured to obtain a network parameter of the first communications system;
the processor further configured to configure a spectrum sharing manner between the first communications system and the second communications system and a spectrum sharing parameter according to the network parameter; and
a transmitter, configured to send a spectrum resource allocation message to a base station in the second communications system, wherein the spectrum resource allocation message comprises the determined spectrum sharing manner and the spectrum sharing parameter, so that the base station in the second communications system shares a spectrum with the first communications system in the determined spectrum sharing manner; wherein
the network parameter comprises at least one type of: distribution information of terminals with different capabilities in the first communications system or carrier quantity information of a base station in the first communications system;
the distribution information of terminals with different capabilities comprises: a proportion or quantity of terminals in the first communications system that support carrier aggregation, distribution information of terminals in each cell that support carrier aggregation, a proportion or quantity of terminals that are in all terminals supporting carrier aggregation and that support cross-carrier scheduling, and distribution information of terminals in each cell that support cross-carrier scheduling; and
the spectrum sharing manner comprises: a first sharing manner that does not support carrier aggregation, a second sharing manner that supports carrier aggregation, and a third sharing manner that supports both carrier aggregation and cross-carrier scheduling.

9. The network control device according to claim 8, wherein the network control device is a central node configured to control the base station in the first communications system and the base station in the second communications system to perform resource coordination, and the network control device further comprises:
a receiver, configured to receive a spectrum allocation result from the base station in the second communications system, wherein
the transmitter is further configured to send the spectrum allocation result to the base station in the first communications system, so that the base station in the first communications system enables, according to the spectrum allocation result, the first communications system to perform spectrum sharing with the second communications system, wherein
the central node comprises a single resource controller or an operation administration and maintenance device.

10. The network control device according to claim 8, wherein the network control device is a base station in the first communications system and the network control device further comprises:

a receiver, configured to receive a spectrum allocation result from the base station in the second communications system; and
a processor, configured to enable, by the network control device according to the spectrum allocation result, the second communications system to perform spectrum sharing with the first communications system.

11. The network control device according to claim 8, wherein the processor is configured to configure the first sharing manner comprises:
in a downlink of the first communications system and a downlink of the second communications system, the processor is configured to configure, for a broadcast control channel of the second communications system, a first spectrum exclusive to the second communications system, and uses the first spectrum as an exclusive spectrum of the broadcast control channel; and
the processor is configured to configure, as an exclusive spectrum of the first communications system, a second spectrum on which a common channel of the first communications system is located; and configure a third spectrum within downlink system bandwidth of the first communications system as a downlink shared spectrum of the first communications system and the second communications system, wherein the third spectrum is all or some spectrums, except the second spectrum, within the downlink system bandwidth of the first communications system.

12. The network control device according to claim 8, wherein the processor is configured to configure the first sharing manner comprises:
in an uplink of the first communications system and an uplink of the second communications system, the s the processor is configured to configure, as an exclusive spectrum of the first communications system, a fourth spectrum on which an uplink control channel is located and that is within system bandwidth of the first communications system; and configure a fifth spectrum within uplink system bandwidth of the first communications system as an uplink shared spectrum of the first communications system and the second communications system, wherein the fifth spectrum is all or some spectrums, except the fourth spectrum, within the uplink system bandwidth of the first communications system.

13. The network control device according to claim 9, wherein the processor is specifically configured to configure the second sharing manner comprises:
in a downlink of the first communications system and a downlink of the second communications system, the processor is configured to configure, for a broadcast control channel of the second communications system, a first spectrum exclusive to the second communications system, and use the first spectrum as an exclusive spectrum of the broadcast control channel; and
the processor is configured to configure the first communications system to send a downlink primary synchronization channel and a downlink secondary synchronization channel on a second spectrum on which a synchronization channel of the first communications system is located, wherein a manner of sending the downlink primary synchronization channel and the downlink secondary synchronization channel comprises at least one of the following manners:
the processor is configured to configure the second spectrum as an exclusive spectrum of the first communications system, and configure a third spectrum within downlink system bandwidth of the first communications system as a downlink shared spectrum of the first communications system and the second communications system, wherein the third spectrum is all or some spectrums, except the second spectrum, within the downlink system bandwidth of the first communications system, and the downlink primary synchronization channel and the downlink secondary synchronization channel of the first communications system are sent on the second spectrum; or the processor is configured to configure the second spectrum as an exclusive spectrum of the first communications system, and configure a third spectrum within downlink system bandwidth of the first communications system as a downlink shared spectrum of the first communications system and the second communications system, wherein the third spectrum is all or some spectrums, except the second spectrum, within the downlink system bandwidth of the first communications system, and the downlink primary synchronization channel and the downlink secondary synchronization channel of the first communications system are sent on the second spectrum only in a downlink transmission timeslot of the first communications system; or the processor is configured to configure the second spectrum as an exclusive spectrum of the first communications system, and configure a third spectrum within downlink system bandwidth of the first communications system as a downlink shared spectrum of the first communications system and the second communications system, wherein the third spectrum is all or some spectrums, except the second spectrum, within the downlink system bandwidth of the first communications system, the network control device enables interference, caused by the first communications system to the second spectrum, to be lower than a preset threshold, and the downlink primary synchronization channel and the downlink secondary synchronization channel of the first communications system are sent on the second spectrum; and in an uplink of the first communications system and an uplink of the second communications system, the processor is configured to configure a fifth spectrum within uplink system bandwidth of the first communications system as an uplink shared spectrum of the first communications system and the second communications system, wherein the fifth spectrum is all or some spectrum configurations within the uplink system bandwidth of the first communications system, wherein a downlink carrier of the third spectrum and an uplink carrier of the fifth spectrum are used to be configured as secondary component carriers for configuring carrier aggregation by the first communications system; and the first communications system and the second communications system use the third spectrum and the fifth spectrum in a time division manner.

14. The network control device according to claim 13, wherein in a downlink transmission timeslot of the second communications system, the third spectrum is used by the second communications system to transmit a physical downlink shared channel, or the second spectrum is further used to transmit a downlink feedback for uplink data in the first communications system;

in the downlink transmission timeslot of the first communications system, the third spectrum is used by the first communications system to transmit a physical downlink shared channel, the first spectrum is used by the second communications system to transmit the broadcast control channel, the second spectrum is used to transmit the downlink feedback for the uplink data in the first communications system, and the second spectrum and the third spectrum are further used to transmit a physical downlink control channel in the downlink transmission timeslot;

in an uplink transmission timeslot of the second communications system, the fifth spectrum is used by the second communications system to transmit a physical uplink shared channel, and an uplink feedback that is for downlink data and is of user equipment in an activated state in the first communications system is transmitted on a primary component carrier of the first communications system; and in an uplink transmission timeslot of the first communications system, the fifth spectrum is used by the first communications system to transmit a physical uplink shared channel, the uplink feedback that is for the downlink data and is of the user equipment in the activated state in the first communications system is transmitted on the primary component carrier of the first communications system, and scheduling information of the physical uplink shared channel is transmitted on the second spectrum and the third spectrum.

\* \* \* \* \*